US008152441B2

(12) United States Patent
Hofmann

(10) Patent No.: US 8,152,441 B2
(45) Date of Patent: Apr. 10, 2012

(54) SUBMERSIBLE WATERWHEEL WITH HINGED ROTOR BLADES AND SPRING-LOADED WATER SEALS

(75) Inventor: Ray Hofmann, Capistrano Beach, CA (US)

(73) Assignee: Ray F. Hofmann, Capistrano Beach, CA (US)

( * ) Notice: Subject to any disclaimer, the term of this patent is extended or adjusted under 35 U.S.C. 154(b) by 952 days.

(21) Appl. No.: 12/114,210

(22) Filed: May 2, 2008

(65) Prior Publication Data

US 2008/0279687 A1    Nov. 13, 2008

Related U.S. Application Data

(60) Provisional application No. 60/915,641, filed on May 2, 2007.

(51) Int. Cl.
*F03B 15/06* (2006.01)
(52) U.S. Cl. .............. 415/4.1; 415/7; 415/8; 415/173.2; 415/173.3; 415/906; 416/85; 416/224
(58) Field of Classification Search ................... 415/4.1, 415/4.2, 4.4, 7, 8, 121.2, 126, 173.1, 173.2, 415/173.3, 174.2, 906, 174.1; 416/43, 54, 416/84, 85, 87, 111, 224, 247 R
See application file for complete search history.

(56) References Cited

U.S. PATENT DOCUMENTS

| | | | | |
|---|---|---|---|---|
| 2,310,816 A | * | 2/1943 | Taylor | 415/141 |
| 4,023,915 A | * | 5/1977 | Kerby | 415/182.1 |
| 4,104,536 A | | 8/1978 | Gutsfeld | |
| 4,383,797 A | * | 5/1983 | Lee | 415/7 |
| 4,436,480 A | | 3/1984 | Vary | |
| 4,618,318 A | * | 10/1986 | Hansen | 418/111 |
| 4,679,985 A | | 7/1987 | Worms | |
| 4,818,888 A | | 4/1989 | Lenoir, III | |
| 5,051,059 A | | 9/1991 | Rademacher | |
| 5,440,175 A | * | 8/1995 | Mayo et al. | 290/54 |
| 5,947,678 A | * | 9/1999 | Bergstein | 415/3.1 |
| 6,109,863 A | | 8/2000 | Milliken | |
| 6,877,968 B2 | * | 4/2005 | Godsall et al. | 418/268 |
| 7,521,816 B2 | * | 4/2009 | Helfrich | 290/54 |

FOREIGN PATENT DOCUMENTS

| | | |
|---|---|---|
| JP | 2005-90318 | 4/2005 |
| JP | 2007-56735 | 3/2007 |
| KR | 8900642 | 3/1989 |

OTHER PUBLICATIONS

International Search Report and Written Opinion of the International Searching Authority for corresponding PCT/US08/062420.
Bellis, Lester Allan Pelton—Water Turbines and the Beginnings of Hydroelectricity—Lester Allan Pelton (1829-1908) (2 pgs.).
Ovens, "Design Manuel for Water Wheels", VITA, Inc., 1975 (71 pgs.).
Monson et al, "Overshot and Current Water Wheels", Bulletin 398, Montana Agricultural Experiment Station, 1976 (30 pgs.).

* cited by examiner

*Primary Examiner* — Edward Look
*Assistant Examiner* — Andrew C Knopp

(57) ABSTRACT

A reengineered undershot waterwheel adapted to capture unutilized hydrokinetic energy is provided. In an exemplary embodiment, the blades, partitions, and shafts of the waterwheel are composed of engineered plastics and composites for improved operation and longevity. In other embodiments, the waterwheel may be fixed, floating, partially or fully submerged, mounted vertically or horizontally, and will operate in deep and shallow flowing water sources.

21 Claims, 20 Drawing Sheets

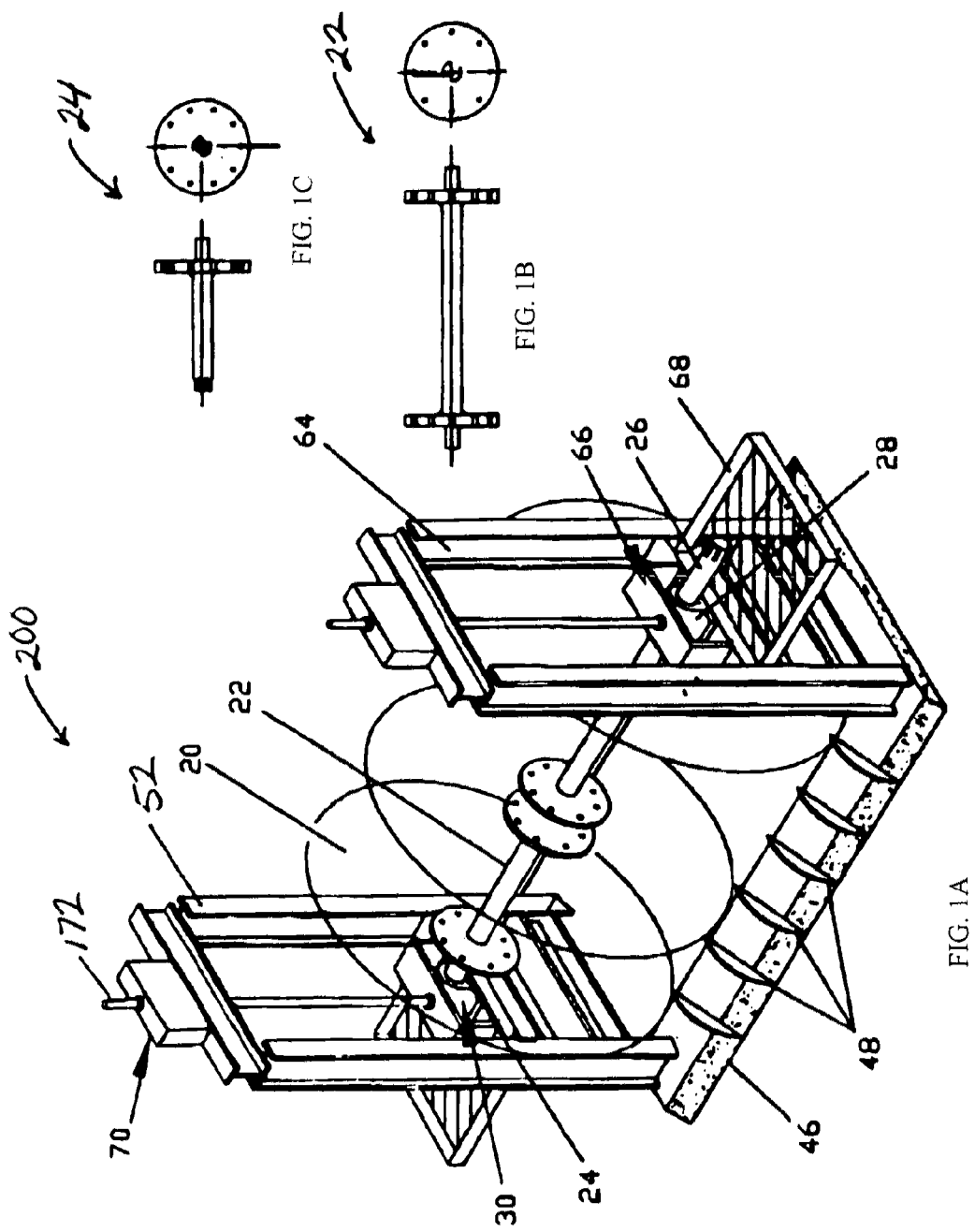

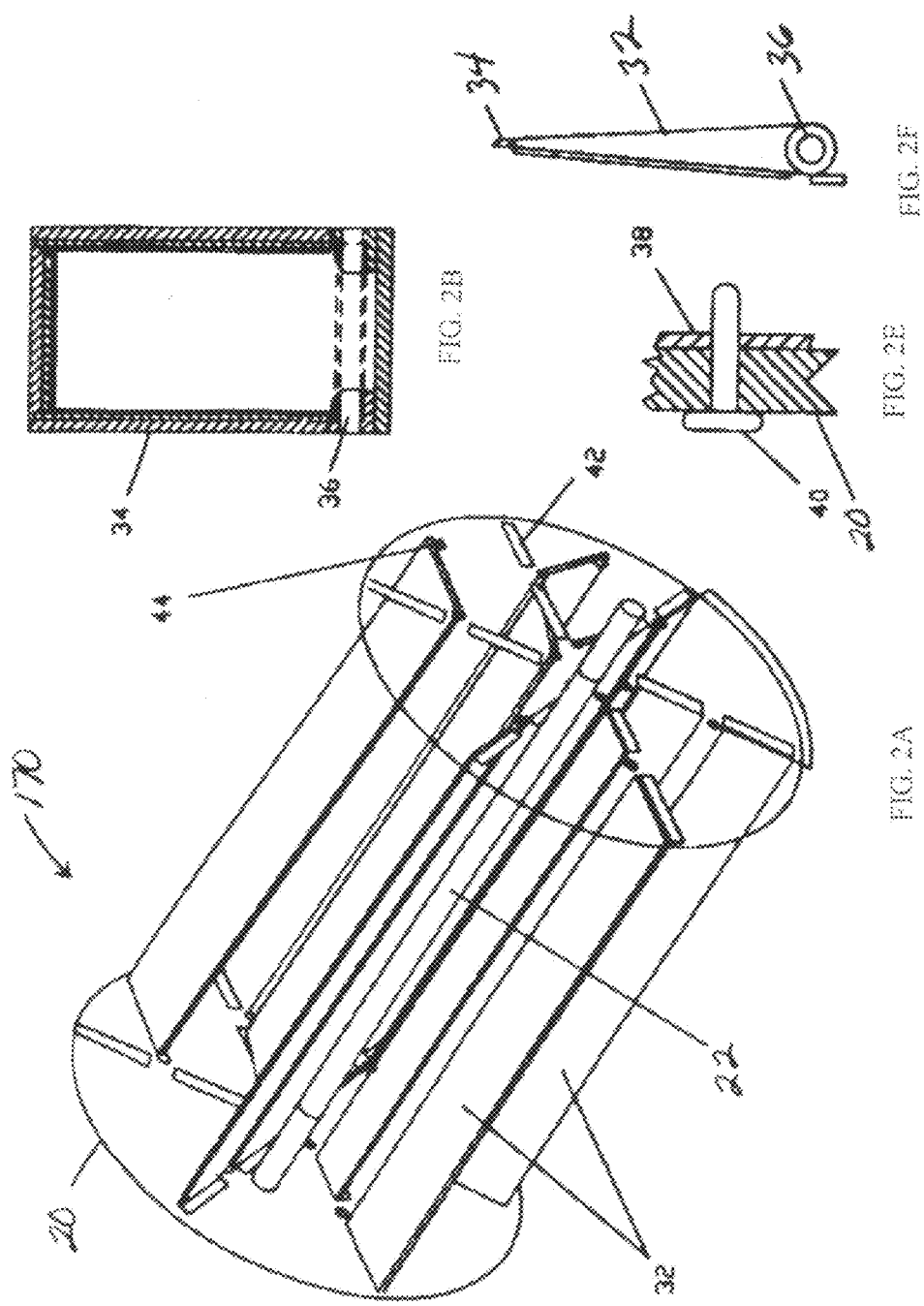

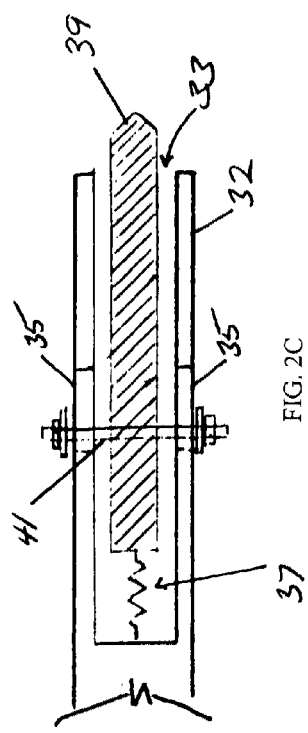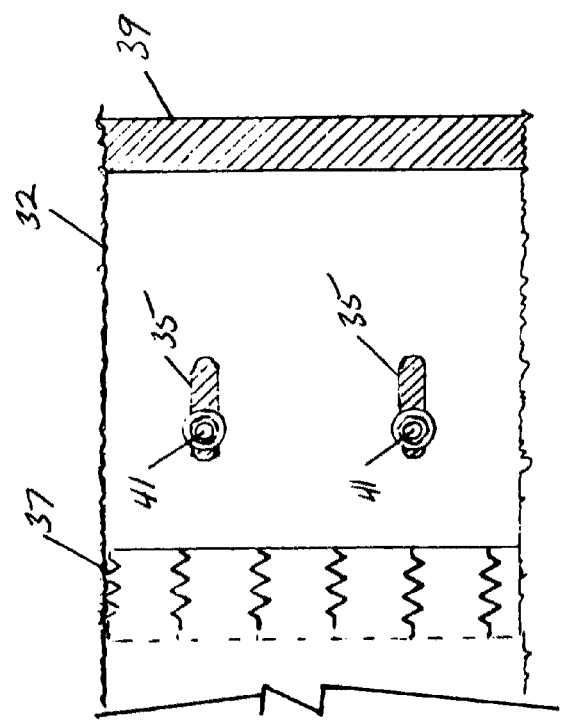

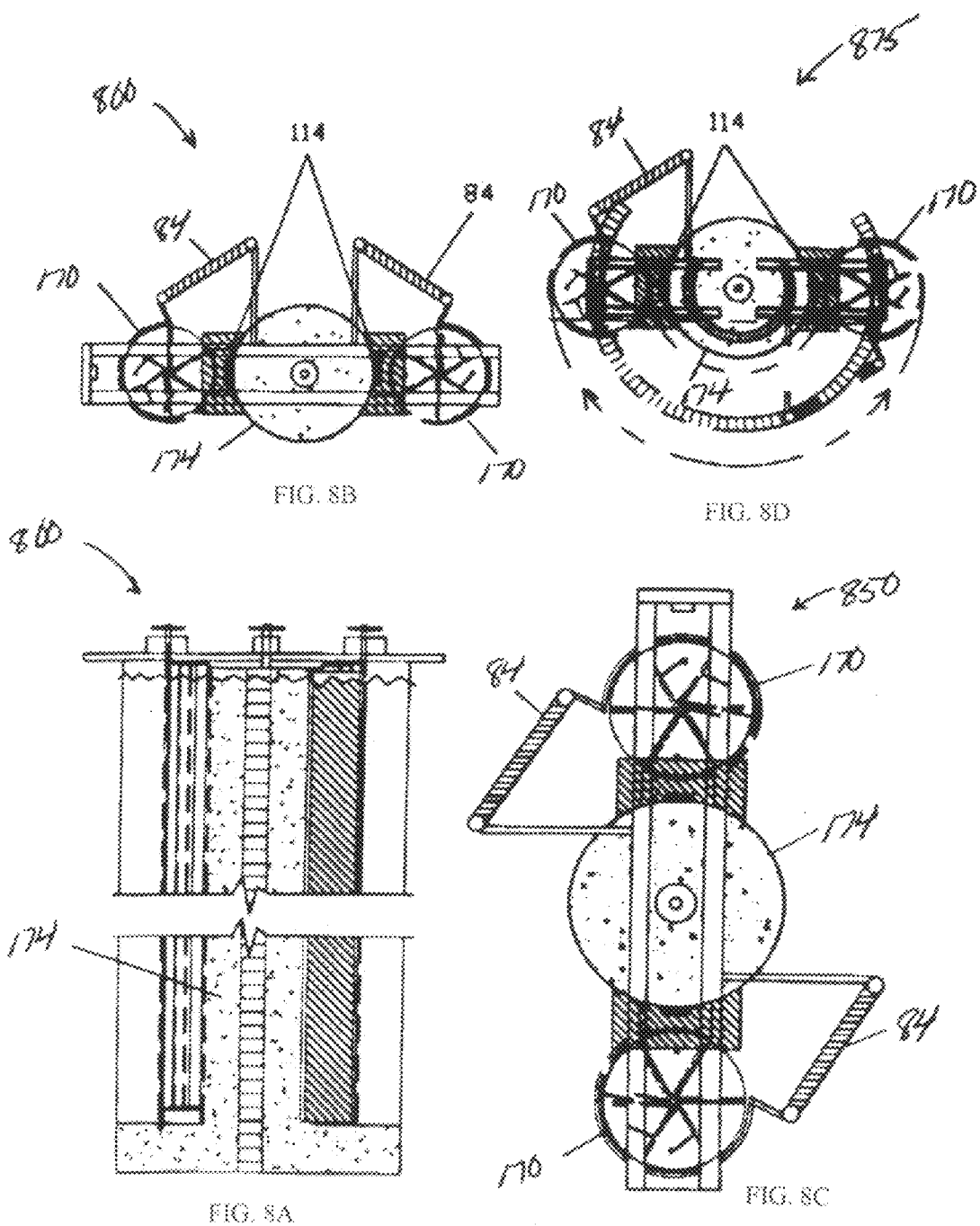

HES – HYDROGEN PIPELINE/ELECTRIC TRANSMISSION SYSTEM

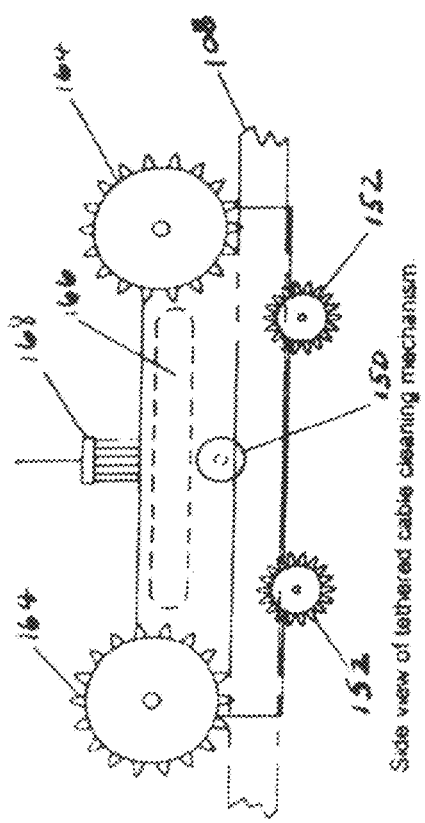
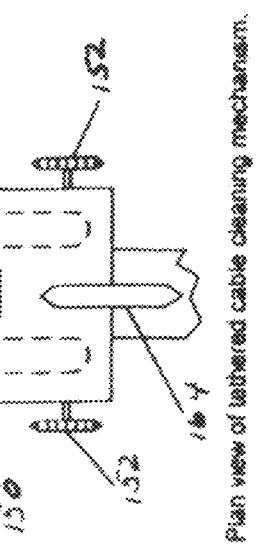
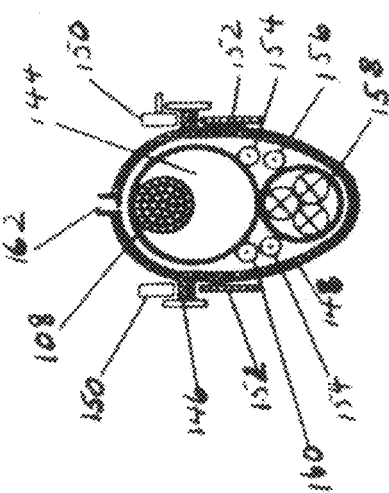
FIG. 15A Side view of tethered cable cleaning mechanism.
FIG. 15B Plan view of tethered cable cleaning mechanism.
FIG. 15C Tethered cable assembly ND ROTOR BLADES AND
SUBMERSIBLE WATERWHEEL WITH HINGED ROTOR BLADES AND SPRING-LOADED WATER SEALS This application claims priority to, and the benefit of the filing date, of U.S. Provisional Application No. 60/915,641, filed May 2, 2007, which is incorporated herein by reference in its entirety.

TECHNICAL FIELD

The present invention generally relates to waterwheels and, in particular, to the application of waterwheels with improved efficiency to non-polluting energy conversion applications.

BACKGROUND

Waterwheels are used to convert the energy of moving water into rotational energy, which in turn is used to power linear or rotational mass transport apparatus. Historically constructed of wood, conventional waterwheels had two wooden vertical sidepieces supporting a horizontal wooden axle. Rigid vanes, blades or buckets, also fabricated from wood, were mounted radially around the rim of the horizontal axle. Some later designs had pivoting blades. The use of iron components and fasteners became common during the Renaissance.

There are three general types of waterwheels, the undershot, the overshot, and the breast waterwheel. Of the three, the undershot waterwheel is the oldest variety and was the most commonly used. It was placed so that the water flowed under the wheel, engaging the blades, vanes, or buckets and causing the wheel to turn. The early Egyptians and Persians used it extensively to drive water-lifting devices use for irrigation.

Although notably inefficient, it was the undershot waterwheel that functioned as the prime mover for running the thousands of sawmills that built early America. It generated mechanical energy for gristmills to grind grain, and carding mills to comb wool, and cutting nails and shingles, and powering machines that turned wood for furniture parts.

However, conventional undershot waterwheels had the following disadvantages:

They had high structural mass and weight that contributed to low mechanical efficiency.

Due to the high structural mass and weight, construction of independent dams, sluices, or penstocks was often necessary to route the water to the waterwheel.

The blades, vanes or buckets were rigidly attached to the sidewalls and the rotating center shaft. This contributed to the retention of water at certain points of rotation, adding weight and creating inherent drag.

The materials of construction were prone to corrosion, rot, and general deterioration with the attendant cost of replacement and loss of use.

Interference by floating and submerged debris caused damage, and loss of use during removal and/or repair.

Maintenance was time consuming, difficult, and costly.

The undershot waterwheel did not utilize the full velocity of the moving water. The lack of a bottom plate or horizontal shoe promoted turbulence and allowed substantial water to flow down and under the blades, vanes, or buckets during the power portion of the cycle.

The lack of a bottom plate or horizontal shoe also contributed to scouring of the streambed.

Only approximately one-third the side length of the blades, vanes, or buckets was utilized. This limited the pushing and lifting effect of the water.

Atmospheric drag on the blades, vanes, or buckets when above water level contributed considerably to loss of efficiency.

The waterwheel has progressed in more modern days, but even these newer machines suffer from some of the aforementioned disadvantages. Therefore, there exists a need for an improved waterwheel and methods of using same.

Accordingly, it is an object of the present invention to provide a waterwheel apparatus, through the use of fiber reinforced polymers, carbon fiber composites, nano-composites, and other technologically advanced materials, having superior performance properties including high compressive, tensile, and shear strength, durability, and high strength-to-weight ratios.

It is a further object of the present invention to provide for the incorporation of toughened epoxy resins, improved carbon fiber reinforced plastics, and enhanced carbon/epoxy composites, combined with newly modified nanoparticles, into the design and manufacturing process of the herein described waterwheel apparatus.

It is a further object of the present invention to provide a waterwheel that is lightweight yet rugged and so versatile that no significant modifications are required for operation in a multitude of conditions, locations, and configurations, and that is easily scaled in size.

SUMMARY

The present invention provides a system, apparatus and methods for overcoming one or more of the disadvantages of conventional waterwheels noted above. In one embodiment, a waterwheel apparatus includes a rotor assembly comprising a plurality of circular partitions, fabricated from engineered plastics, that provide exterior sides and inner separators for a plurality of one-piece flanged rotor shafts. The partitions may have V-belt drive grooves around their circumference.

In one embodiment, the inboard rotor shafts may have flanges at each end with pre-drilled mounting holes that align with pre-drilled holes in the partitions. The outboard rotor shafts that connect to the exterior of the outboard partitions may have a flange with pre-drilled mounting holes on one end and a splined shaft on the other end. One of the outboard rotor shafts may be fitted with a held-type bearing. The other outboard rotor shaft may be fitted with a floating bearing.

In another embodiment, multiple hinged rotor blades may be mounted radially between the partitions from the periphery of the rotor shafts to the outer edges of the partitions. The outside edges of the rotor blades may be fitted with spring-loaded water seals. The water seals may be constructed with slots and keepers. The hinged rotor blades may be secured to the partitions with ceramic hinge pins through predrilled holes in the partitions. The partitions may be equipped with forward-swing and backswing energy dampener/stops for the rotor blades.

In one embodiment, a venturi-type inlet duct may be mounted on the inflow side of the waterwheel. In this embodiment, an elongated inlet duct assembly may be connected to the front of the venturi-type inlet duct. The waterwheel rotor assembly may be suspended over the centerline of a horizontal thrust shoe. The horizontal thrust shoe may be equipped with recessed embeds on both ends for retaining the legs of vertical maintenance towers ("maintenance towers"). The venturi-type inlet duct is secured to the leading bottom edge of the thrust shoe, and to the leading inside edges of the maintenance towers.

A filtering grill/cleaning rake assembly and a trash storage bin may be mounted on the elongated inlet duct assembly. The maintenance towers may be equipped with lifting frame assemblies. Splined ends of outboard rotor shafts and their respective bearing housings rest in the lifting frame assemblies. Jackscrew assemblies mounted on top of the maintenance towers are configured to raise and lower the lifting frame assemblies. Equipment mounting platforms may be attached to outboard sides of the lifting frame assemblies.

Enclosing the upper one-half of the rotor assembly is a cover that is split and hinged. For installation sites with vertical or sloped banks, air dams may be mounted on the outboard side of the maintenance towers. For installation sites with sloping sides of a hard material (e.g., concrete, brick, etc.), rotor assemblies may be cantilevered on the outboard sides of the maintenance towers.

BRIEF DESCRIPTION OF THE DRAWINGS

Embodiments of the present invention described herein are illustrated by way of example and not by way of limitation, in the figures of the accompanying drawings, in which:

FIG. 1A illustrates a perspective view of a stationary rotor assembly in one embodiment;

FIG. 1B illustrates a side view of a double-flange inboard rotor shaft in one embodiment;

FIG. 1C illustrates a side view of a single-flange outboard rotor shaft in one embodiment;

FIG. 2A illustrates a perspective view of a hinged blade rotor assembly in one embodiment;

FIGS. 2B and 2F illustrate a plan view and a side view respectively of a hinged blade assembly in one embodiment;

FIGS. 2C and 2D illustrate a water seal assembly in one embodiment;

FIG. 2E illustrates a replaceable wear shield in one embodiment;

FIGS. 8A and 8B illustrate a side and a plan view respectively of a dual stationary waterwheel apparatus with vertically-mounted rotor assemblies mounted on a pier in one embodiment;

FIG. 8C illustrates a plan view of a dual stationary waterwheel apparatus with vertically-mounted rotor assemblies with horizontally opposed intakes mounted on a pier in one embodiment;

FIG. 8D illustrates a plan view of a single stationary waterwheel apparatus with a movable vertical rotor assembly mounted to a pier with two directional rack and pinion drive assemblies in one embodiment;

FIGS. 15A, 15B and 15C illustrate various views of a tethered cable assembly and a cable cleaning system in one embodiment.

Figure 3:
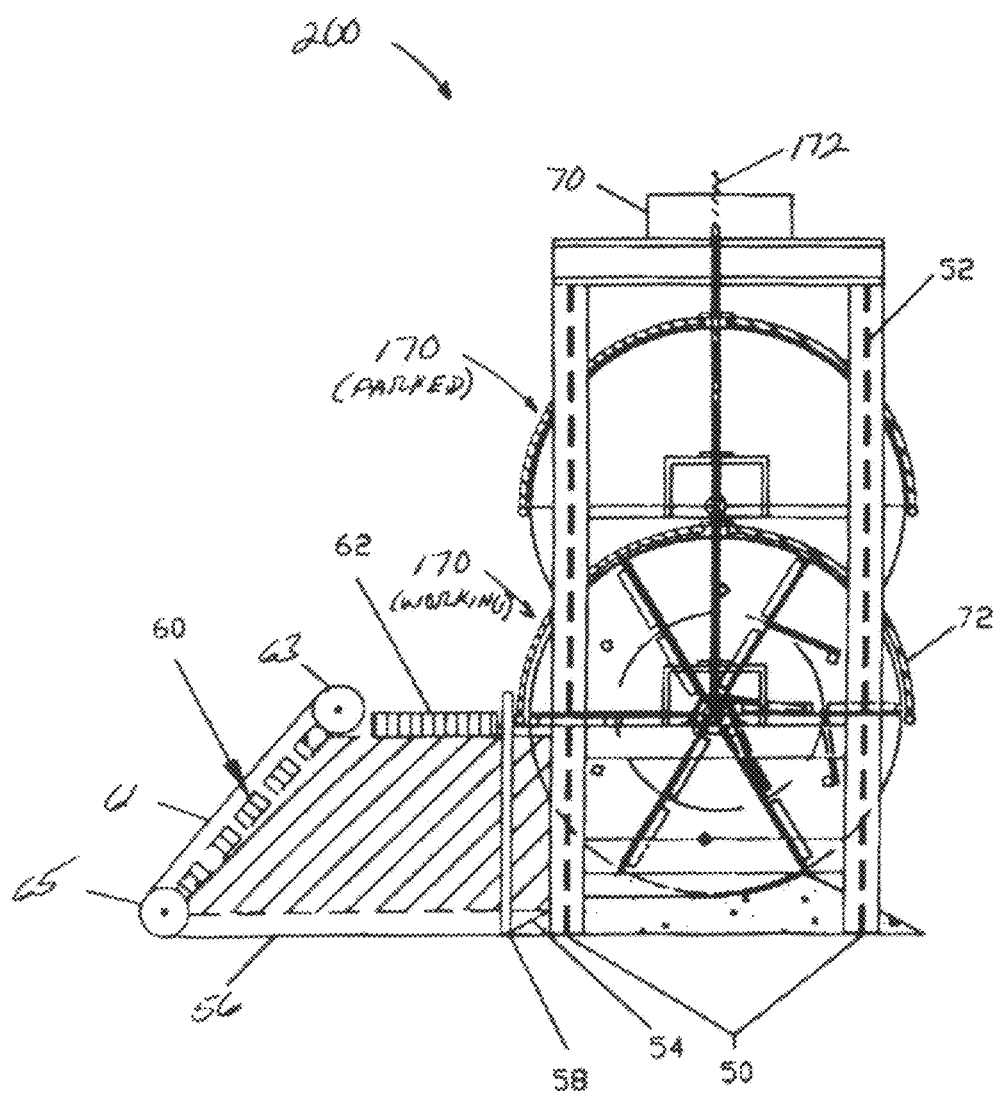
FIG. 3 illustrates a side view of a stationary waterwheel apparatus with inlet ducts in one embodiment.

It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION

In the following paragraphs, the present invention will be described in detail by way of example with reference to the attached drawings. While this invention is capable of embodiment in many different forms, there is shown in the drawings and will herein be described in detail specific embodiments, with the understanding that the present disclosure is to be considered as an example of the principles of the invention and not intended to limit the invention to the specific embodiments shown and described. That is, throughout this description, the embodiments and examples shown should be considered as exemplars, rather than as limitations on the present invention. Descriptions of well known components, methods and/or processing techniques are omitted so as to not unnecessarily obscure the invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Water wheels have been used for a number of years to accomplish many manual tasks. Additionally, waterwheels have been used to generate energy. These waterwheels suffer from a number of limitations that various aspects of the present invention address.

One embodiment of a stationary waterwheel apparatus 200, illustrated in FIG. 1A, includes a plurality of circular partitions, such as partition 20, that serve as exterior sides and inner separators for one-piece inboard rotor shafts 22 and one-piece outboard rotor shafts 24 as illustrated in FIGS. 1B and 1C, respectively. In an exemplary embodiment, the partitions 20 may be fabricated from a reinforced plastic additionally strengthened through isogrid stiffening technology as is known in the art. The number of partitions 20 may be site installation dependent.

The one-piece inboard rotor shafts 22 are flanged on both ends as illustrated in FIG. 1B. The one-piece outboard rotor shafts 24 are flanged on one end and are equipped with a splined-end rotor drive journal ("drive journal") 26 on the other end, as illustrated in FIG. 1C. In one embodiment, the inboard rotor shafts 22 may be a plastic derived from plastic filament winding technology as is known in the art. In one embodiment, the outboard rotor shafts 24 may be a combination of reinforced plastic, derived from plastic filament winding technology. The number of inboard rotor shafts 22 is determined by site installation requirements.

The partitions 20 are equipped with pre-drilled mounting holes to accommodate installation of the inboard and outboard rotor shafts 22 and 24. The flanged ends of the inboard and outboard rotor shafts 22 and 24 are also pre-drilled for installation. The flanged ends of the inboard rotor shafts 22 are bolted to the partitions 20. The flanged ends of the outboard rotor shafts 24 are bolted to the exterior of the outboard partitions 20.

The drive journal 26 of the outboard rotor shaft 24 on one side of the stationary waterwheel assembly 200 is fitted with a held-type bearing assembly 28. The drive journal 26 of the outboard rotor shaft 24 on the other side of the rotor assembly is fitted with a floating bearing assembly 30.

FIG. 2A illustrates a rotor assembly 170 comprising a plurality of hinged rotor blades 32 mounted between partitions 20. In one embodiment, in order to mitigate water leakage and loss of kinetic energy, each hinged rotor blade 32 may be fitted with spring-loaded water seal assemblies 34 as illustrated in FIGS. 2B and 2F. As illustrated in FIGS. 2C and 2D, there is a groove 33 on each of the outside edges of each hinged rotor blade 32. There are slot-shaped openings 35 that go through the two outside surfaces of the rotor blade 32 and through the groove 33. Tension springs 37 and water seals 39 are placed in the grooves 33 of the rotor blade 32. Thru-bolts 41 are inserted through the slots and predrilled openings in the water seals 39 and secured on each side of the rotor blade 32 with nuts and washers. The springs 37 place tension against the water seals 39 and the thru-bolts 41 hold the springs 37 and water seals 39 in place. The slots allow for gradual outward movement (from the spring tension) of the water seal 34 as it wears.

The inboard edges of the hinged rotor blades 32 that will be closest to the inboard rotor shafts 22 have cylindrical openings on each side into which water-lubricated plastic bearings 36 are installed as illustrated in FIG. 2B. In one embodiment the hinged blades 32 are fabricated from reinforced plastic additionally strengthened through internal and external isogrid stiffening technology as is known in the art.

Replaceable wear shields 38, illustrated in FIG. 2E, are placed on the partitions 20 in preformed recesses that have a center hole. The hinged blades 32 are mounted to the partitions 20 radially from the periphery of the inboard rotor shafts 22 to the outer edges of the partitions 20. The hinged blades 32 are secured to the partitions 20 through the wear shields 38 with ceramic hinge pin assemblies 40 as illustrated in FIG. 2E. As illustrated in FIG. 2A, forward-swing and backswing energy dampener/stops 42 and 44 may be mounted on the partitions 20 for each hinged blade 32.

In one embodiment, as illustrated in FIG. 1A, waterwheel apparatus 200 may include a horizontal thrust shoe 46 with vertical flow-straightening vanes 48. As illustrated in FIG. 3, the ends of the thrust shoe 46 may be equipped with openings 50 to accept the legs of maintenance towers 52. In one embodiment, the horizontal thrust shoe 46 may be fabricated from lightweight aggregate and reinforced concrete and the flow-straightening vanes 48 may be reinforced plastic.

The legs of maintenance towers 52 are attached to the thrust shoe 46 via the openings 50. In one embodiment, the maintenance towers 52 are fabricated from reinforced plastic structural shapes. Liner guides 64, which may be, for example, an acetyl copolymer, are installed on the insides of the legs of the maintenance towers 52. Lifting frame assemblies 66, comprising boxes with two open sides that house the rotor shaft bearings and housings 28 and 30 of the outboard rotor shaft journals, are fitted inside the liner guides 64 of the maintenance towers 52. In one embodiment, the lifting frame assemblies may be fabricated from reinforced plastic structural shapes. Equipment mounting platforms 68 are secured to the outboard sides of the lifting frame assemblies 66. Jackscrew assemblies 70 are secured to the tops of the maintenance towers 52. Screw shafts 172 of the jackscrew assemblies 70 are secured to jackscrew gear motors (not shown) and to the lifting frame assemblies 66. FIG. 3 illustrates the rotor assembly 170 in its working (lowered) and parked (raised) positions.

A venturi-type inlet duct 54 is fitted to a groove (not shown) on the leading edge of the thrust shoe 46 and secured to the legs of the maintenance towers 52. An elongated inlet duct 56, with internal flow-directing vanes (not shown), is attached by a flange 58 to the front of the venturi-type inlet duct 54. A filtering grill/cleaning rake assembly 60 and a debris storage bin 62 may be installed on the front and top, respectively, of the elongated inlet duct 56. Filtering grill/cleaning rake assembly 60 may include a continuous loop filtering/cleaning rake screen 61 engaged with an upper axle 63 and a lower axle 65, which may be selectively engaged with the rotor assembly 170 to provide motive power. When engaged, the continuous loop filtering/cleaning rake screen 61 continuously filters out debris from the water flow and transports the debris to the debris storage bin 62.

The waterwheel rotor assembly 170 may be positioned over the centerline of the horizontal thrust shoe 46 and placed against the venturi-type inlet duct 54. The housings of the held-type and floating bearings 28 and 30 on the outboard rotor shafts 24 rest on the lifting frame assemblies 66. Housings for bearings 28 and 30 are bolted to the lifting frame assemblies 66.

The jackscrew assemblies 70 mounted on the maintenance towers 52 are used to raise and lower the lifting frame assemblies 66 on which the waterwheel rotor assembly 170 is supported. In the raised position, the rotor assembly 170 is accessible for maintenance. The lowered position can be adjusted so that the rotor assembly 170 is at an appropriate operating depth for the water source. The top half of the rotor assembly 170 is fitted with a double-hinged split cover 72 that is secured to the lifting assemblies 66. The hinged cover 72 provides a personnel safety guard, protection from wind, and spray containment.

The inlet ducts 54 and 56, on the inflow side of the rotor assembly, channel and direct the water flow down to the hinged blades 32. The flow-straightening vanes 48 of the horizontal thrust shoe 46 also serve to stabilize and direct the inflow.

The hinged blades 32 interface with the incoming water creating torque on the rotor shafts 22 and 24, and the rotor assembly 170 begins rotating. The main held-type bearing 28, in which one of the outboard rotor shafts 24 is encased, supports and stabilizes the rotor assembly 170 during rotation. The floating bearing 30 on the other outboard rotor shaft 24 allows for horizontal movement of the rotor assembly during rotation.

As the hinged blades 32 enter and leave the water they settle on the energy dampener/stops 42 and 44 at specific points of rotation determined by the radial length of the hinged blades 32 and the positions of the energy dampener/stops 42 and 44. When the hinged blades 32 fully interface with the incoming flow, they are held against the forward-swing dampener/stops 42 by the water's force. As rotation continues, the hinged blades 32 leave the water and settle on the backswing dampener/stops 44. The spring-loaded water seals 34 ensure minimal water leakage through the hinged blades 32, and increase the generation of torque.

Rotational speed continues to increase as each subsequent set of hinged blades 32 moves into position. The kinetic energy provided by the moving water and rotation of the rotor assembly 170 is transferred to the inboard and outboard rotor shafts 22 and 24 where it is converted into mechanical energy.

The water-lubricated plastic bearings 36 and ceramic hinge pins 40 facilitate freedom of movement of the hinged blades 32 and keep them securely attached to the partitions 20. The replaceable wear shields 38 mitigate wear of the partitions.

Figure 4:
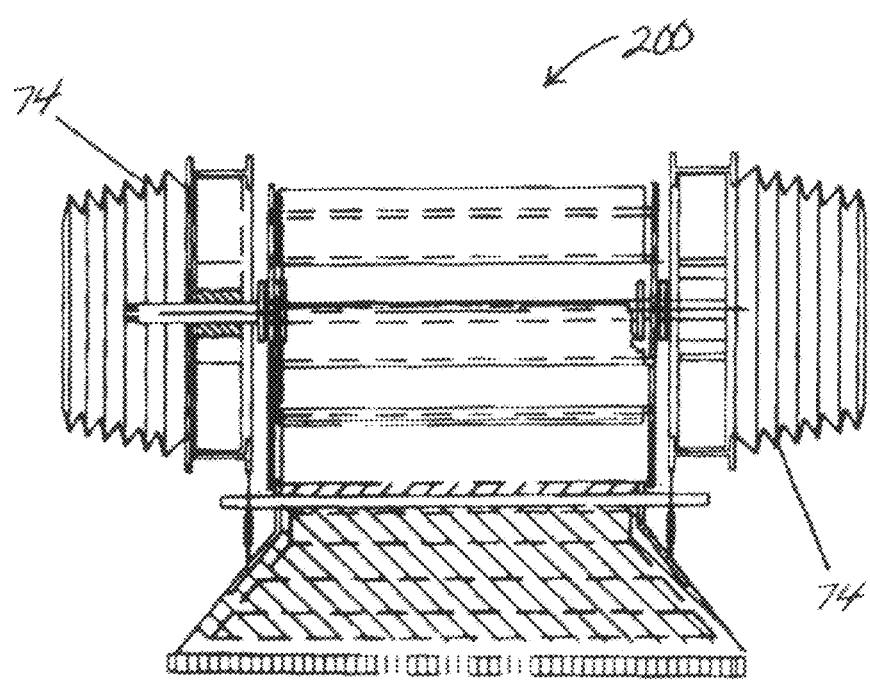
FIG. 4 illustrates a plan view of a stationary waterwheel apparatus with air dams in one embodiment.

For use in earthen or vertical concrete-banked watercourses, air dams 74 may be installed on the bank sides of the maintenance towers, as illustrated in FIG. 4. The air dams may be fabricated, for example, from a rubber/plastic impregnated cloth with UV protection. When installed, the air dams 74 function to minimize both the loss of water along the sides of the maintenance towers 52, and to reduce erosion of earthen banks.

Figure 5B:
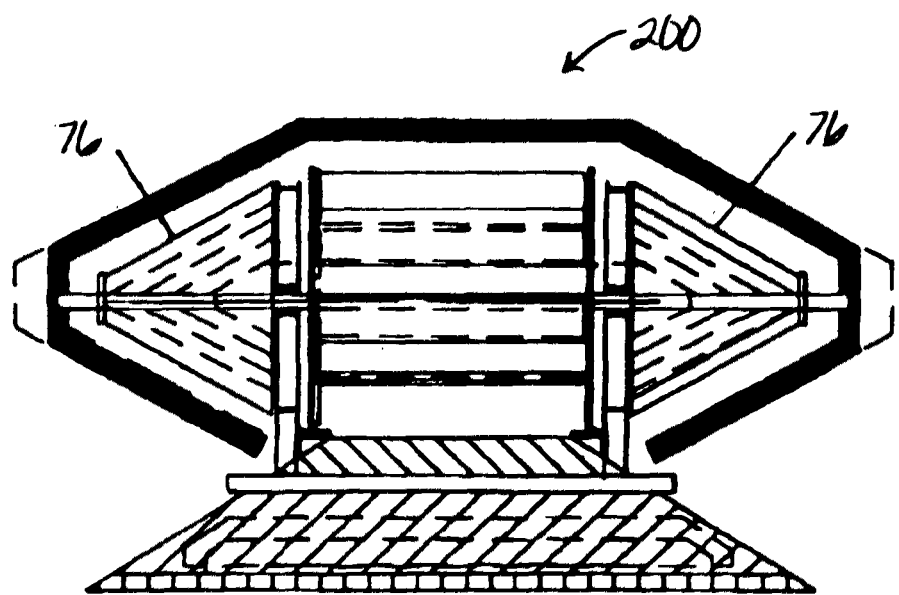
FIGS. 5A and 5B illustrate a side and a plan view respectively of a stationary waterwheel apparatus having outboard rotor assemblies with cantilevered blades in one embodiment.
Figure 5A:
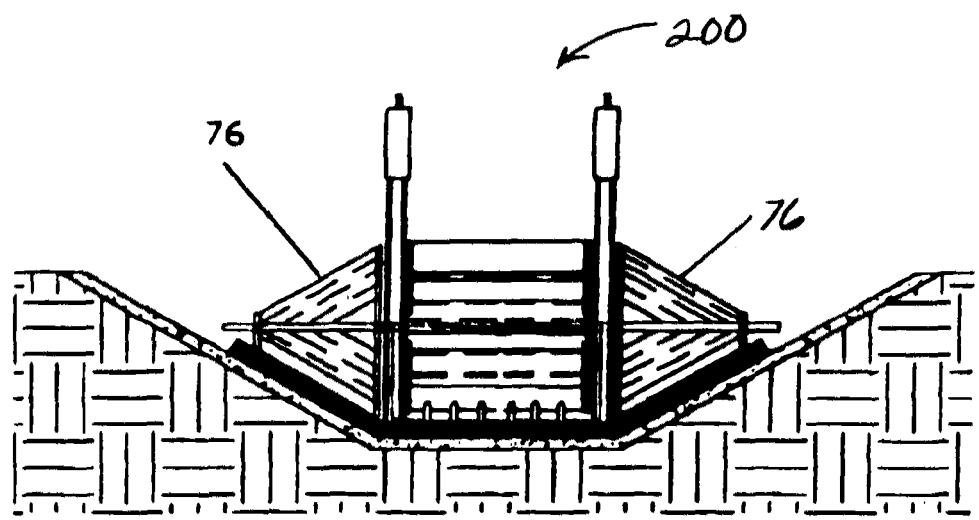

If the waterway is a hard material, such as concrete, brick, etc., and the banks are sloping, rotor blades 76 that cantilever from the outboard sides of the maintenance towers 52 may be installed on the waterwheel apparatus 200 as illustrated in FIG. 5A and FIG. 5B. When installed, the cantilevered rotor blades 76 take advantage of the full breadth and depth of the water flow, and negate the need for air dams and vertical stationary concrete retaining structures. In some embodiments, the cantilevered blades may be on only one side, with an air dam 74 on the other.

Figure 6A:
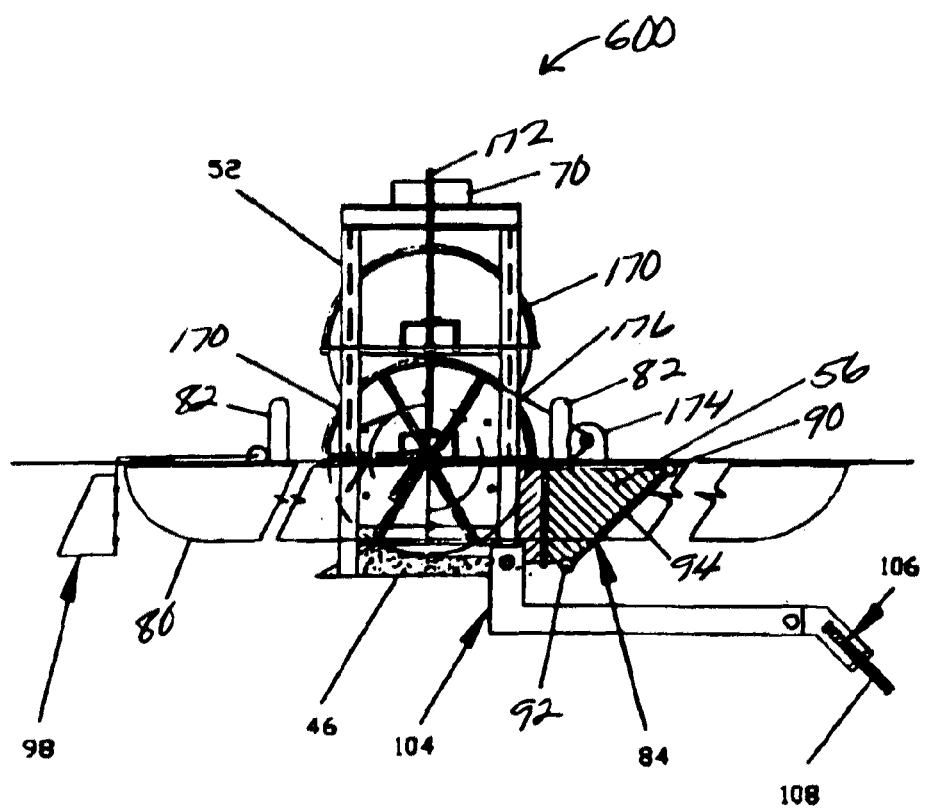
FIGS. 6A, 6B and 6C illustrate a side, a plan, and a frontal view respectively of a floating waterwheel apparatus in one embodiment.
Figure 6B:
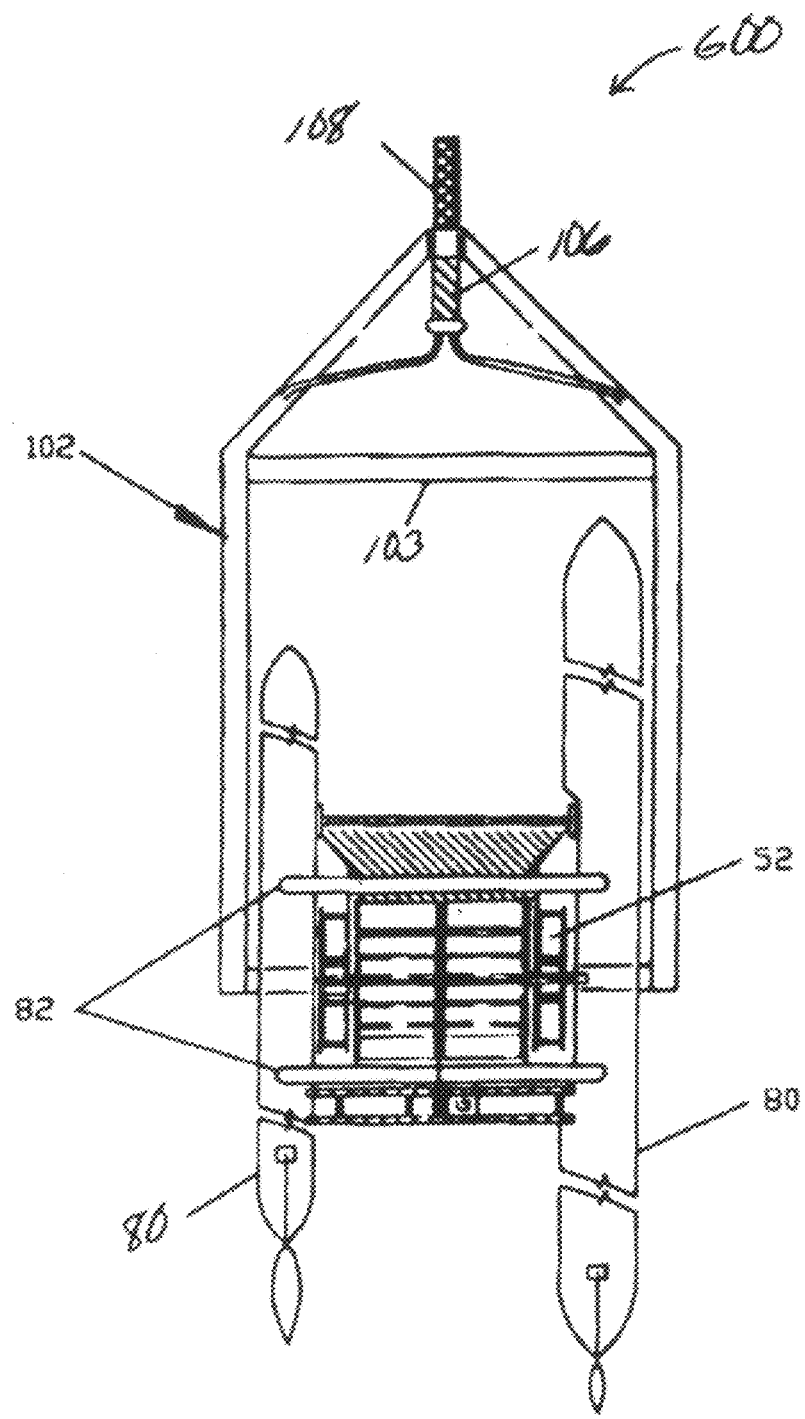
Figure 6C:
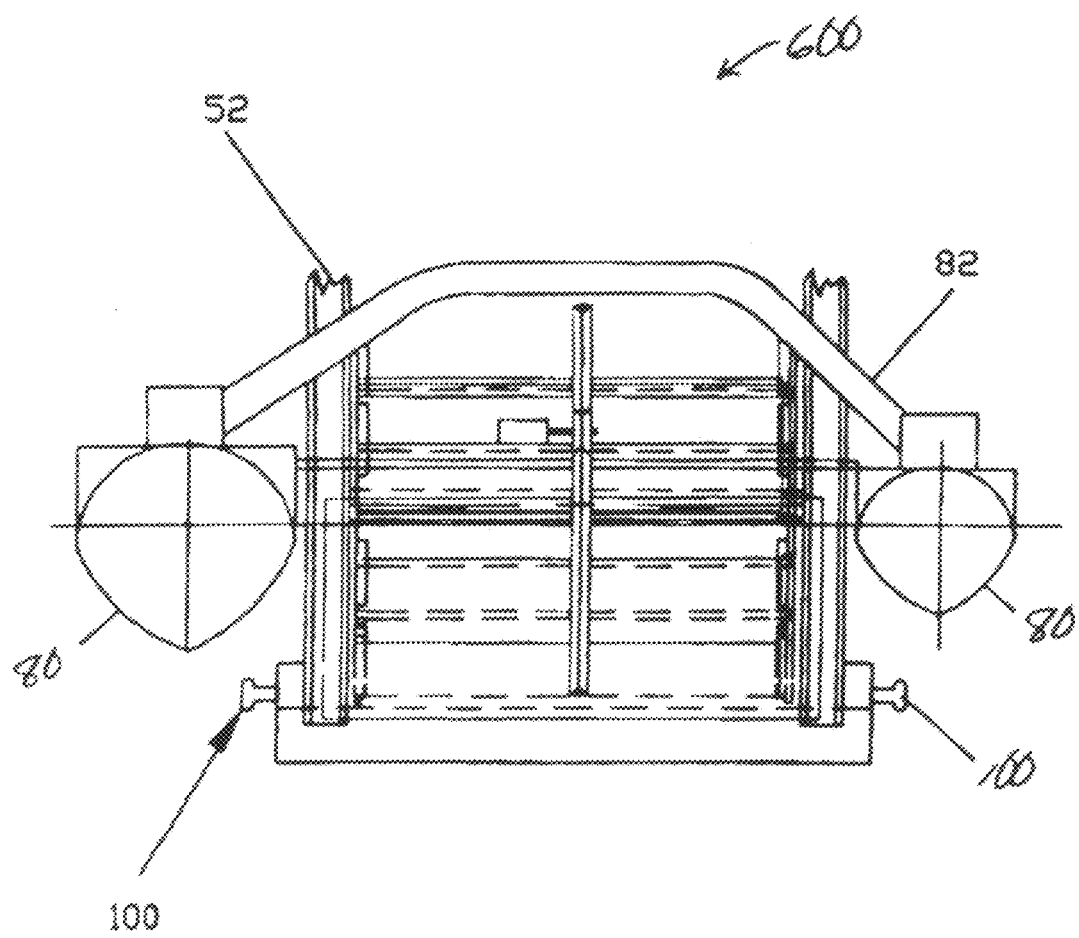

FIGS. 6A, 6B and 6C illustrate a side view, a plan view and a frontal view, respectively, of a floating waterwheel apparatus 600. FIGS. 6A and 6B illustrate the floating waterwheel apparatus 600 with pontoons 80 attached by cross-mounting assemblies 82 to the maintenance towers 52. In this embodiment, the pontoons 80 keep the rotor assembly 170 afloat. In other respects, the operation of the floating waterwheel apparatus 600 is similar to that of the stationary waterwheel apparatus 200. Jackscrew assemblies 70 are installed on top of the maintenance towers 52 and screw shafts 172 are secured to lifting frame assemblies 66. A horizontal thrust shoe 46 is installed beneath the rotor assembly 170 and attached to the legs of the maintenance towers 52. The thrust shoe 46 for the floating waterwheel apparatus 600 may be fabricated from reinforced plastic and structural closed cell foam. The top half of the waterwheel rotor assembly may be fitted with a double-hinged split cover 72 that is secured to the lifting assemblies 66.

One of the pontoons 80 may be enlarged and sized to compensate for the additional weight of selected driven equipment mounted on the waterwheel apparatus as described in greater detail below. External shells of the pontoons 80 and the cross-mounting assemblies 82 may be fabricated from reinforced plastic additionally strengthened with isogrid stiffening technology as is known in the art. The internal areas of the pontoons 80 and cross-mounting assemblies 82 may be fabricated from closed-cell structural foam, for example.

FIG. 6A illustrates a motor-driven rotary filtering screen assembly 84 attached to the elongated inlet duct 56 that covers the water-inflow area. The filtering screen assembly 84 covers additional vertical and horizontal length in order to accommodate a horizontal manifold of a pressurized water backwash system. Two pressure sensors (not shown) are installed in the elongated inlet duct 56. One is located upstream of a filtering screen 94 inlet and the other is located on the downstream side of the filtering screen 94. The pressure sensors installed in the elongated inlet duct determine the pressure differential between the filtering screens. When a predetermined pressure differential is exceeded, an on-board computer activates a screen wash pump, which can be driven hydraulically, electrically, mechanically or pneumatically, and the drive mechanism activates a full 360° rotating wash cycle. When the screen drive mechanism shuts down, the pressure sensors resample the flow through the screens. If the pressure differential again exceeds the pre-determined value, another full cycle and backwash occurs. If after three full cycles the differential is still above the pre-determined value, the on-board computer shuts the rotary filtering screen assembly down and transmits a remote radio alarm that maintenance intervention is required. As the filtering screen passes over the nozzles of the backwash system, accumulated material is washed from the screen and carried away by the water flow.

Mounted to the leading edge of the elongated inlet duct 56 is a horizontal driven shaft 90 with a sprocket on each end. An identical freewheeling shaft 92 is mounted on the bottom of the elongated inlet duct 56. Driven shaft 90 and freewheeling shaft 92 are similar in operation to axles 63 and 65 described above. The sprockets fit into pre-formed drive slots on each side of the filtering screen 94, which is similar to filtering screen 61 described above. The shafts 90 and 92 are secured to the elongated inlet duct 56 via mounted bearing housings (not shown).

The backwash system includes a series of backwash nozzles, a horizontal manifold, a screen wash pump, and a screen drive motor. Such components are known in the art and, accordingly, are not described in detail. The backwash system is mounted between the bottom of the motor-driven shaft 90 and the top of the elongated inlet duct 56. The backwash system runs the full length of the elongated inlet duct 56.

The rotary filtering screen assembly 84, which may be installed at a 45° angle, keeps the rotor assembly free of debris. As the filtering screen 94 passes over the nozzles of the backwash system, accumulated material is washed from the screen 94 and is carried away by the water flow beneath the waterwheel apparatus 600.

As illustrated in FIG. 6C, yoke attachment ears 100 are installed on the outboard and lower sides of the vertical maintenance towers 52. FIG. 6B illustrates a Y-shaped rigid yoke assembly 102 with a crossbar 103 at the lower V points. Yoke assembly 102 may be attached to the yoke attachment ears 100. Both of the Y legs may be hollow to accommodate controls, power cables, and/or communication cables. In one embodiment, as illustrated in FIG. 6A, the yoke assembly 102 has a vertical-drop leg 104 that ensures there will be no interference with the incoming water flow. The yoke assembly 102 may be fabricated from reinforced plastic and carbon fiber, for example.

As illustrated in FIGS. 6A and 6B, a surge suppressor spring assembly 106 and a tether cable 108 are secured to a 360° swivel at the end of the yoke assembly 102. The tether cable may be a single-purpose tether configured to anchor the floating waterwheel apparatus 600 in the watercourse, or multi-purpose tether. A single-purpose tether may be fabricated from low-stretch braided nylon and/or various carbon fibers and polymer-based materials. Multi-purpose tethers may include integrated cables for transporting electrical power generated by the waterwheel apparatus, instrument power and control cable systems, air hoses, buoyancy chambers, and/or communication cables. Preferably, steel cables would be used for multi-purpose tethers. Multi-purpose tethers may also be fitted with guide and drive rails to accommodate a remote controlled tether-cleaning mechanism as described below.

The yoke assembly 102 maintains stability for the entire assemblage and serves as an anchor and pivoting point for the surge suppressor spring assembly 106 and tether cable 108. The surge suppressor spring assembly 106 serves as a moderating influence over movement of the waterwheel apparatus 600 caused by water surge. The tether cable 108 acts as a link between the waterwheel apparatus and its anchor point and as a platform for the tether cleaner.

A remote controlled maneuvering/parking rudder assembly 98 is mounted to the stern of each pontoon 80 and controlled via an on-board computer. Rudders 98 may be used in navigable rivers and waterways where barges, ships, and recreational craft navigate. When the on-board computer sends a signal to the rudders 98, the rudders 98 are programmed to move the floating waterwheel apparatus 600 out of the main current into shallow water. This allows free unobstructed access of the main current to commercial and recreational use.

An additional signal to the rudder assemblies 98 returns the floating waterwheel apparatus 600 back to the main current. When the on-board computer receives a signal that indicates an operating or maintenance problem exists, the rudders again come into play to move and park the apparatus in a shallow area until the problem is resolved.

FIGS. 15A and 15B illustrate a side view and a plan view, respectively, of a tethered cable cleaning mechanism ("cable cleaner") in one embodiment, and FIG. 15C illustrates one embodiment of a tethered cable assembly on which the cable cleaner may operate to keep the tethered cable assembly free of debris and marine growth. The tether 108 is encased in a tether buoyancy chamber 144 that serves as a buoyancy compensator. An armored shielding cover 148 surrounds the tether 108 and tether buoyancy chamber 144. The tether buoyancy chamber 144 provides the cable cleaner mechanism with the ability to surface, descend, and hover.

The armored shielding cover 148 may be fitted with two horizontally opposed cutting drive mounting ears 146 and one top-mounted cable cleaner blade groove 162. The cutting guide mounting ears 146 are for mounting the cable cleaner mechanism on the tether 108. A foliage cutter blade groove 162 functions as a shear point between the serrated cutter blades 164 of the cable cleaner mechanism. The undersides of the cutting guide mounting ears 146 are notched to accept the cable cleaner drive sprockets 152 that are on the cable cleaner mechanism. The cutter drive sprockets 152 propel the movement of the cable cleaner mechanism up and down the tether 108.

Roller guide mounting pulleys 150 secure the cable cleaner mechanism to the tether 108. Ballast tanks 166 keep the cable cleaner mechanism level. The interior of the armored shielding cover 148 may also contain, but is not limited to, communication/control cables 154, an emergency supply gas hose 156, an internal power control cable 160, and power distribution cables 158.

In one embodiment, when the cable cleaner mechanism receives a signal from an on-board waterwheel computer that the rotor assembly is not operating or generating torque, the cable cleaner mechanism parks halfway between the bottom and the surface. During operation of the waterwheel rotor assembly the cable cleaner mechanism is programmed to descend and hover just off the bottom. This prevents the buoyant tether 108 from floating on the surface and interfering with operation of the waterwheel rotor assembly. An emergency recovery snorkel system 168 may be mounted on the top of the cable cleaner mechanism.

Figure 7A:
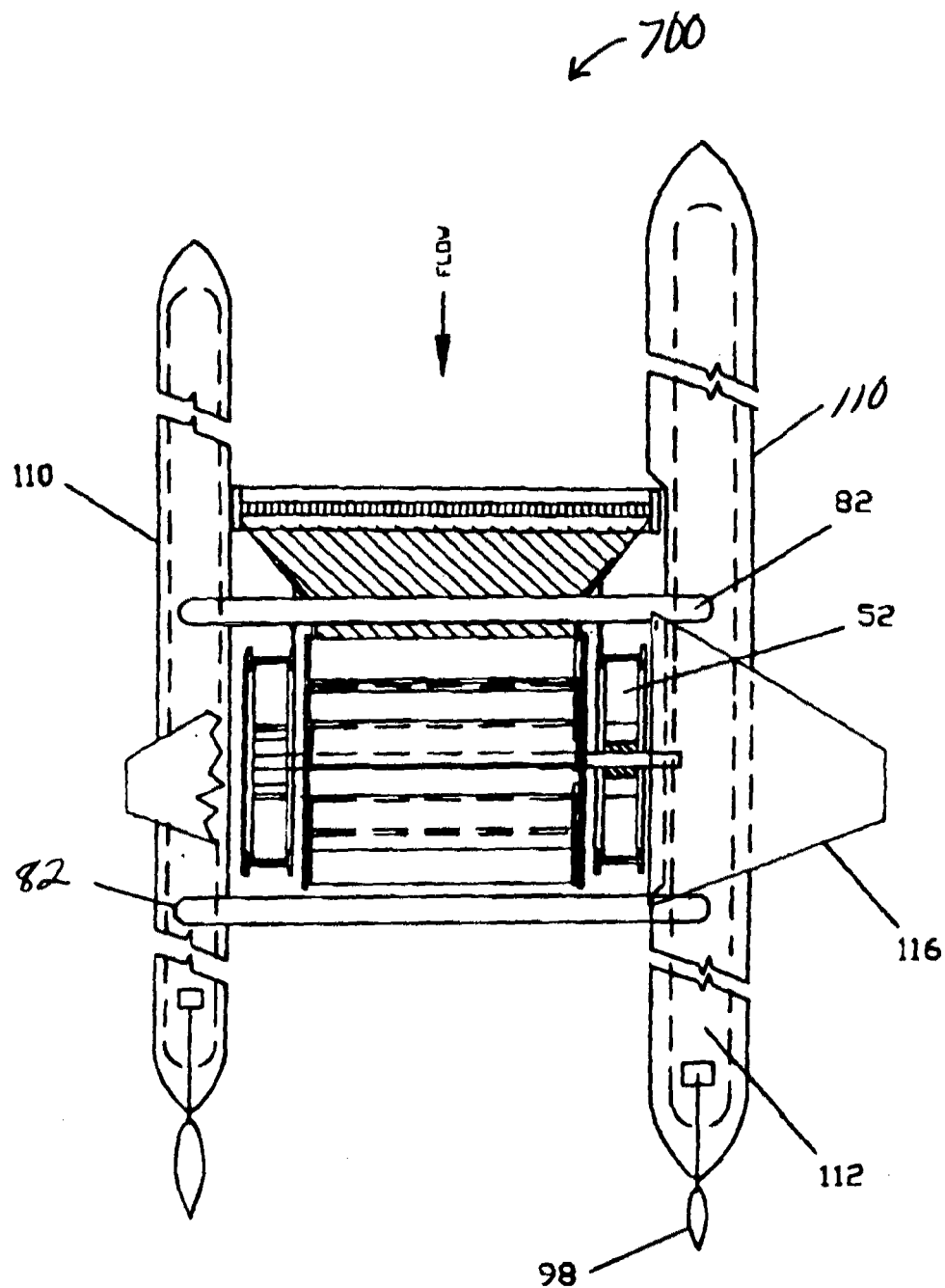
FIGS. 7A, 7B, and 7C illustrate a plan, a side, and a frontal view respectively of a tethered submersible waterwheel apparatus in one embodiment.
Figure 7B:
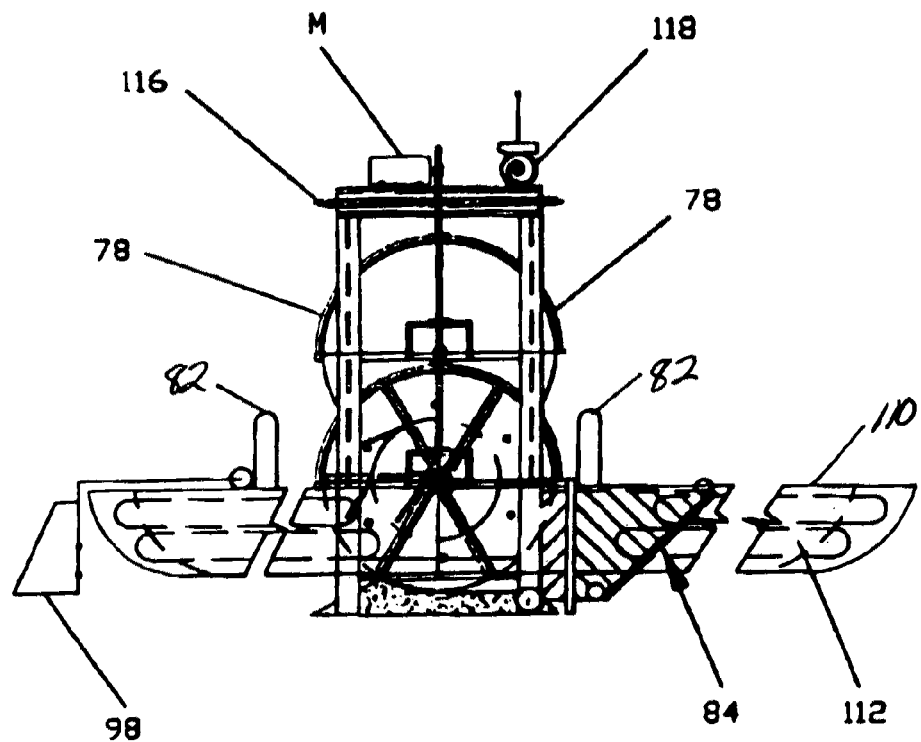
Figure 7C:
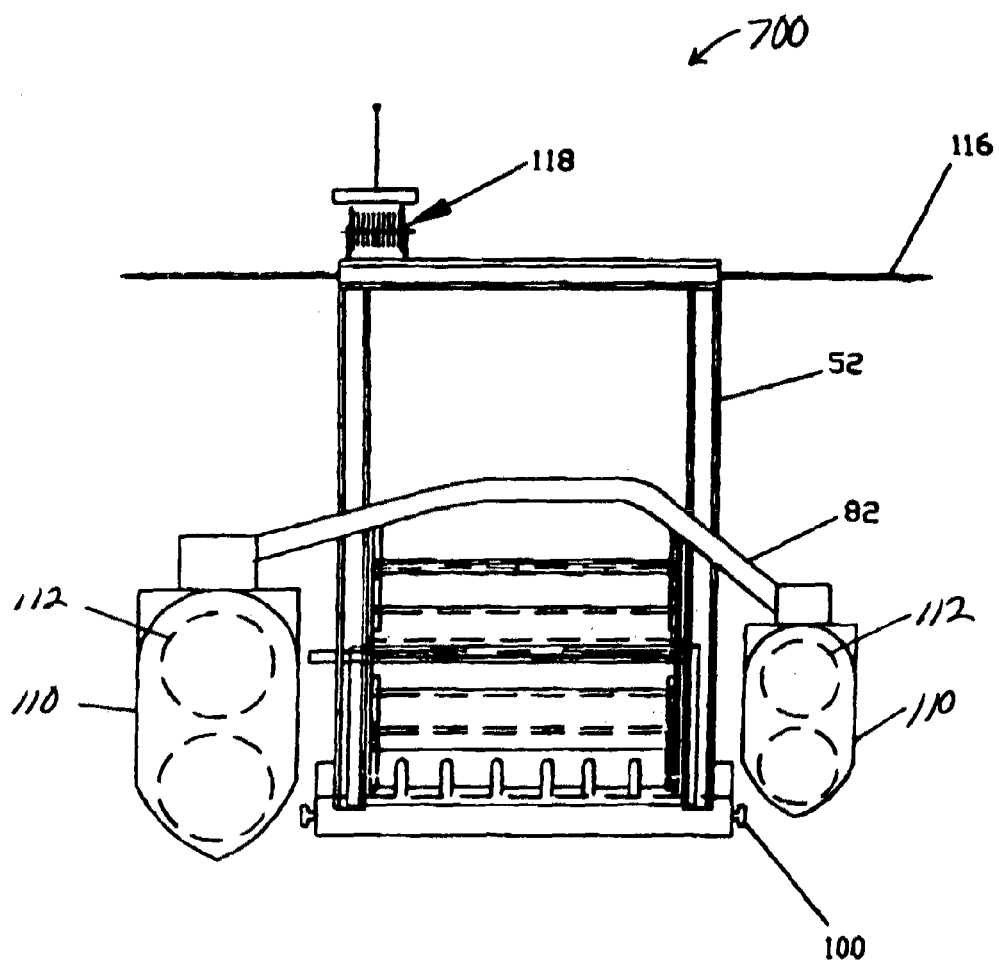

FIGS. 7A, 7B and 7C illustrate side view, a plan view and a frontal view, respectively, of a submersible waterwheel apparatus 700 with two submersible pontoons 110 attached by two cross-mounting assemblies 82 to the vertical members of the maintenance towers 52. In one embodiment, one of the pontoons 110 may be enlarged and sized to compensate for the additional weight of selected driven equipment attached to the submersible waterwheel apparatus 700. Inside the pontoons 110 may be ballast/trim tanks 112 controlled by an on-board computer. The external shells 110 of the pontoons and cross-mounting assemblies 82 may be fabricated from reinforced plastic/carbon fiber and additionally strengthened through isogrid stiffening technology. The ballast/trim tanks 112 may be fabricated from reinforced plastic and carbon fiber composites.

FIG. 7B illustrates a motor-driven rotary filtering screen assembly 84 attached to an elongated inlet duct 56 that covers the entire water-inflow area. Filtering screen assembly 84 has been described above in detail with respect to the floating waterwheel apparatus 600. The filtering screen assembly 84 covers additional vertical and horizontal length in order to accommodate the horizontal manifold of a pressurized water backwash system such as the backwash system described above with respect to the floating waterwheel apparatus 600.

A remote controlled maneuvering/parking rudder assembly 98 may be mounted to the stern of each pontoon 110 and activated via an on-board computer in the same manner as the remote controlled maneuvering/parking rudder assembly 98 attached to pontoons 80 of the floating waterwheel apparatus 600 described above.

Yoke attachment ears 100 are installed on the outboard and lower sides of the vertical maintenance towers 52. A yoke assembly 102, identical to the assembly for the floating waterwheel apparatus 600, is Y-shaped and rigid with a crossbar at the lower V points. The yoke assembly 102 may be attached to the yoke attachment ears 100. The Y-shaped yoke assembly 102 maintains stability for the entire waterwheel apparatus and serves as an anchor and pivoting point for the surge suppressor spring assembly 106 and tether cable 108. Both of the Y legs of the yoke may be hollow to accommodate instrument control cables, power cables, and/or communication cables as described above. In one embodiment the yoke assembly 102 has a vertical-drop leg 104, as illustrated in FIG. 6, that ensures there will be no interference with the incoming water flow.

FIG. 7A illustrates pivoting stabilators 116 that are mounted near the top of each vertical maintenance tower 52 of the submersible waterwheel apparatus 700. The pivoting stabilators 116 may be controlled by an on-board computer to control horizontal axis roll and pitch. Optional, the stabilators 116 may be replaced with wings and ailerons as is known in the art. In one embodiment, the stabilators 116 may be fabricated from reinforced plastic.

FIG. 7B illustrates a 180° closed-end gas-tight clamshell cover 78 that horizontally covers the rotor assembly 170 between the maintenance towers 52. In one embodiment, the clamshell cover 78 is hinged only on one side. The closed-end gas-tight clamshell cover 78 maintains a gas and water-free environment for the top 180° of the rotor assembly 170. This chamber allows the blades 32, either pivoting or fixed, to move through the upper area unimpeded by drag from water. FIG. 7B also illustrates the rotor assembly 170 in both its raised and lowered positions.

FIGS. 7B and 7C illustrate an emergency recovery snorkel system 118 on the top of the maintenance tower 52. Snorkel system 118 may include a radio communication antenna, a red rotating beacon, an air activated float, a recovery air hose, and a lifting cable that can be stored on a rotary reel attached to the rotor assembly 170. The emergency recovery snorkel system 118 is a backup system to recover the submersible waterwheel apparatus 700 in case buoyancy is lost.

Similar to the waterwheel apparatus described above, submersible waterwheel apparatus 700 includes a horizontal thrust shoe 46 installed beneath the rotor assembly 170 and attached to the legs of maintenance towers 52. For the submersible waterwheel apparatus 700, the thrust shoe 46 may be fabricated from reinforced plastic and structural closed cell foam.

The operation of the submersible waterwheel apparatus 700 is essentially the same as that of the stationary waterwheel apparatus 200. The pontoons 110 with the ballast and trim tanks 112 receive input from the on-board computer to reach and maintain various operating depths, maintain buoyancy, and to keep the rotor assembly 170 horizontally level at operating depth. They may also serve to raise the rotor assembly to the surface for maneuvering and parking operations as described above.

The construction and operation of the rotary filtering screen assembly 84 illustrated in FIG. 7B, is likewise similar to that of the rotary filtering screen assembly described above, as are the remote controlled maneuvering/parking rudder assemblies 98 attached to the pontoons 110 to provide for controlled positioning of the submersible assembly in the current at operating depth.

The ballast/trim tanks 112 in the pontoons 110 function in concert with the rudders 98 when a signal is sent from the on-board computer to move the submersible waterwheel apparatus 700 out of the main current. The ballast/trim tanks 112 raise the submersible unit to the surface. Then, the rudders 98 act to move the submersible waterwheel apparatus 700 into shallow water. This allows free unobstructed access of the main current to commercial and recreational use. With additional input from the on-board computer, the rudders 98 return the submersible waterwheel apparatus 700 back to the main current, and the ballast/trim tanks 112 dump and return the submersible waterwheel apparatus 700 back to operating depth.

FIGS. 8A and 8B illustrate a side view and a plan view, respectively, of a dual stationary vertical waterwheel apparatus 800 with rotor assemblies 170 mounted vertically (i.e., having a vertical axis of rotation) on a single concrete pier 174. The rotor assemblies 170 are secured to the pier 174 vertically by rack and pinion drive assemblies 114. The outboard rotor shafts 24 at the bottom of the vertical rotor assemblies 170 are equipped with water-lubricated bearings (not shown) as are known in the art. The outboard rotor shafts 24 at the top of the rotor assemblies 170 are equipped with Kingsbury thrust bearings (not shown) as are known in the art. The bearings on the upper edges of the hinged rotor blades 32 of the rotor assemblies 170 are water-lubricated bearings (not shown) as are known in the art. The bearings on the lower edges of the blades 32 are pre-lubricated sealed thrust type mounted carrier bearings (not shown) as are known in the art. The rotor assemblies 170 may be equipped with rotating filter screen assemblies 84, described above. The lower ends of the rotor assemblies may be equipped with a ballast tank. Thrust shoes 46 can be installed in a vertical position and attached to the legs of maintenance towers 52. A clamshell cover 78 may be installed vertically over each rotor assembly 170.

The operation of the dual stationary vertical waterwheel apparatus 800 is essentially the same, except for the vertical mounting position of the rotor assemblies 170, as that of the stationary horizontal waterwheel apparatus 200. The rack and pinion drive assemblies 114 allow the rotor assemblies 170 to move vertically. The racks of the rack and pinion drive assemblies 114 are mounted vertically to the tops of lifting frame assemblies 66. Motor-driven pinion gears of the assemblies 114 are mounted on top of the maintenance towers 52.

FIG. 8C illustrates a dual stationary vertical waterwheel apparatus 850 having vertical dual rotor assemblies 170 with horizontally opposed rotating filter screen assemblies 84 mounted on a single pier 174. This type of installation may be used in dual-direction flow environments such as tidal flows. The rotor assemblies are secured to the pier 174 vertically by rack and pinion drive assemblies 114. In other respects, the construction and operation of waterwheel apparatus 850 is the same as that of waterwheel apparatus 800.

FIG. 8D illustrates a single stationary vertical waterwheel apparatus 875 with a single rotor assembly 170 mounted vertically to, and movable 180 degrees around, a pier 174. FIG. 8D illustrates the rotor assembly 170 at its two extreme positions, 180 degrees apart. Attached to the pier are two rack and pinion drive assemblies 114. One drive assembly 114 is installed horizontally and the other drive assembly 114 is installed vertically. Operation of the single stationary vertical waterwheel apparatus 875 is essentially the same as that of the dual stationary vertical waterwheel apparatus 800, except for the movable rotor assembly 170. This type of installation may operate in dual-direction tidal flows. The horizontal motor-driven rack and pinion drive assembly 114 moves the rotor assembly horizontally into opposing 180° directions to accommodate changes in tidal flow direction. The vertical motor-driven rack and pinion drive assembly 114 moves the rotor assembly vertically to accommodate changes in tide levels. Computer directional-sensing flow controls are programmed and actuated by flow direction. This keeps the rotor assembly's intake positioned into the incoming flow at all times.

Figure 9B:
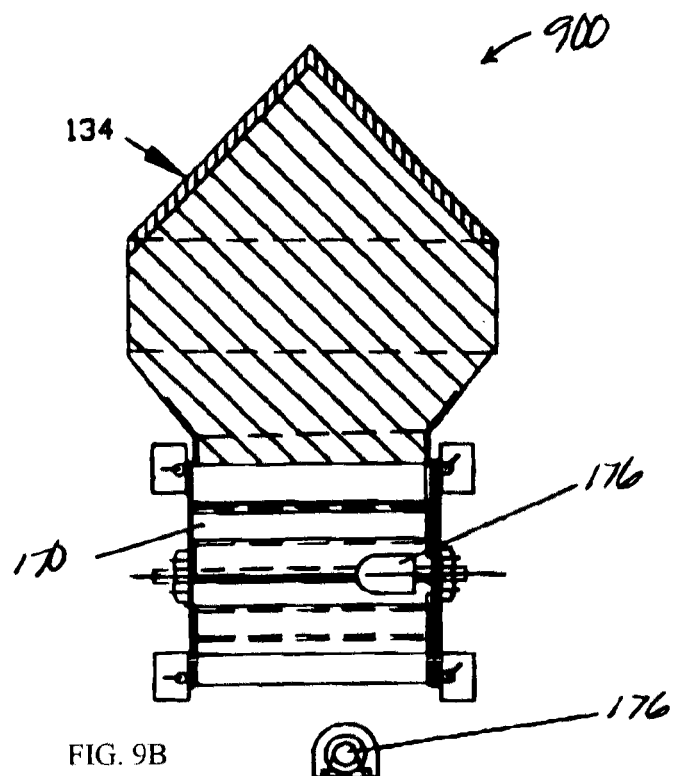
FIGS. 9A and 9B illustrate a plan view and a side view respectively of a portable waterwheel apparatus in one embodiment.
Figure 9A:
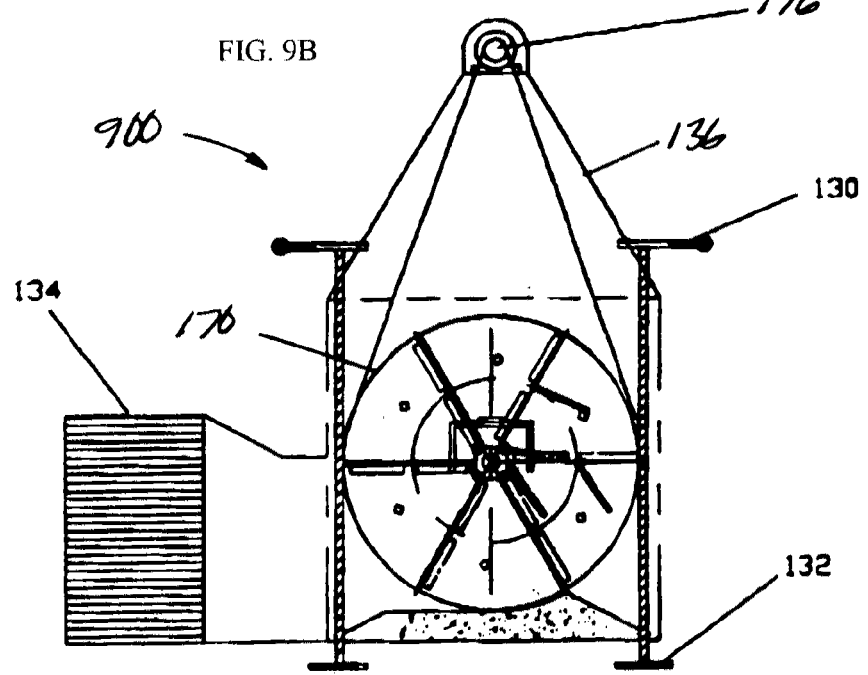

FIGS. 9A and 9B illustrate a side view and a plan view, respectively, of a portable waterwheel apparatus 900. The rotor assembly 170 of the portable waterwheel apparatus 900 is of the same design as the rotor assembly of the horizontal stationary waterwheel apparatus 200, with the following possible exceptions: 1) there may be no maintenance towers; 2) the assembly may have hand leveling mechanisms 130 and landing pads 132; 3) The assembly may have a foldable and collapsible inlet grill 134; 4) The assembly may have a belt-driven vertically mounted generator 176 with a foldable support frame 136. The operation of the portable waterwheel apparatus 900 is essentially the same as the operation of the horizontal stationary waterwheel apparatus 200.

Figure 10A:
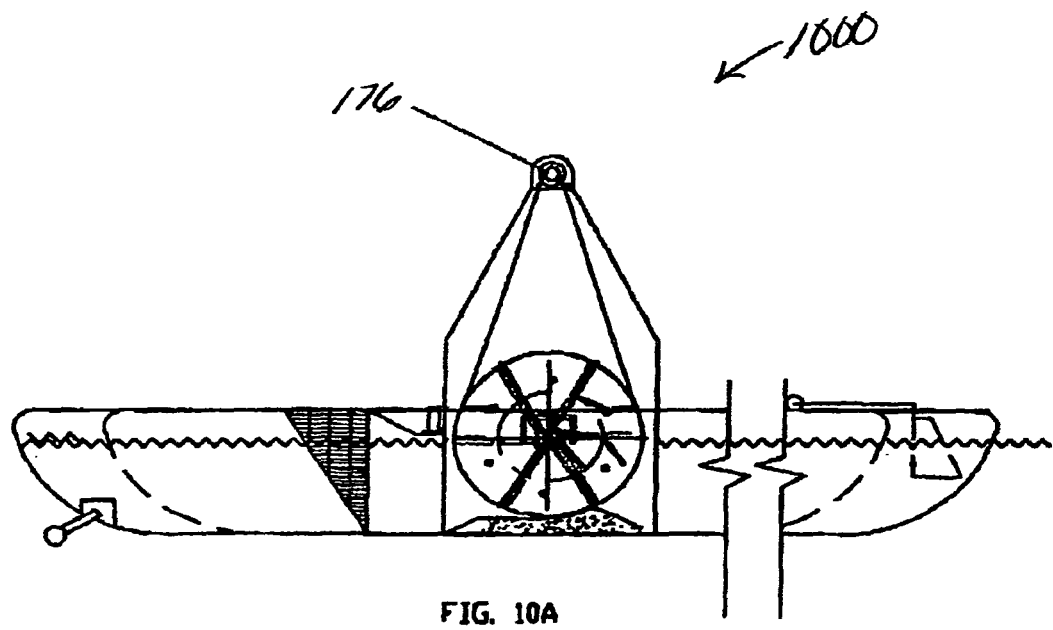
FIGS. 10A and 10B illustrate a side view and a plan view respectively of a portable floating waterwheel apparatus in one embodiment.
Figure 10B:
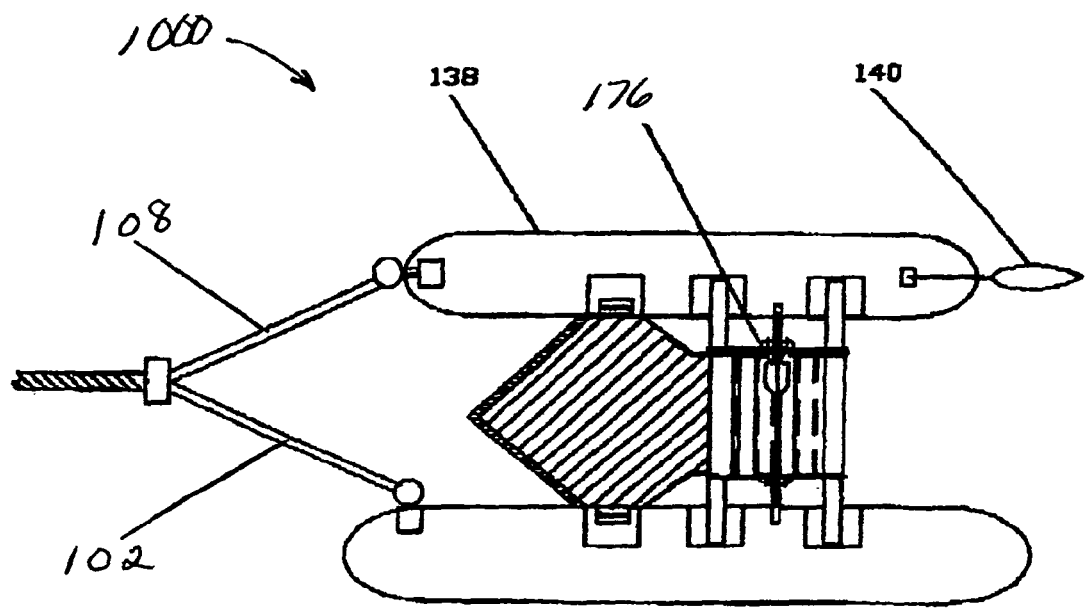

FIGS. 10A and 10B illustrate a plan view and a side view, respectively, of a portable floating waterwheel apparatus 1000. The design and operation of the portable floating waterwheel apparatus 1000 is basically the same as the portable waterwheel apparatus 900, except that: 1) the assembly may float on two attachable air-filled pontoons 138; 2) the assembly may have a manual rudder system 140; 3) the assembly may have an attached yoke assembly 102 and tether system 108; and 4) the assembly may not have hand leveling mechanisms or landing pads.

Figure 11A:
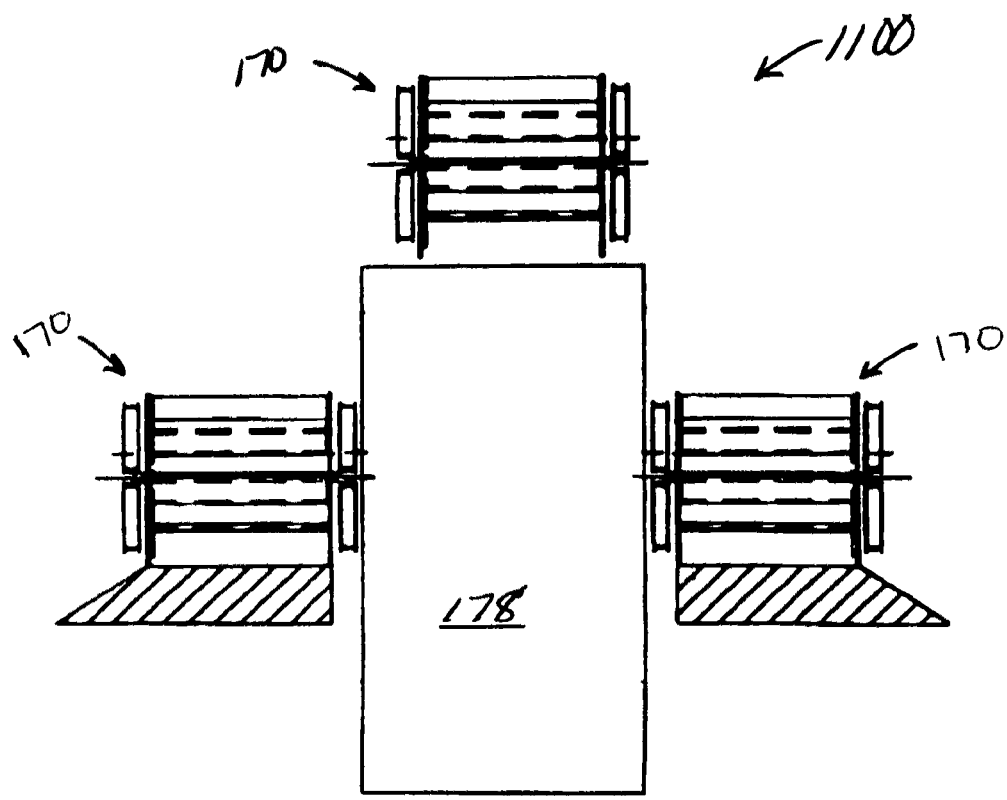
FIGS. 11A and 11B illustrate a plan view and a rear view respectively of a waterwheel apparatus with horizontal waterwheel rotor assemblies attached to a central floating object in one embodiment.
Figure 11B:
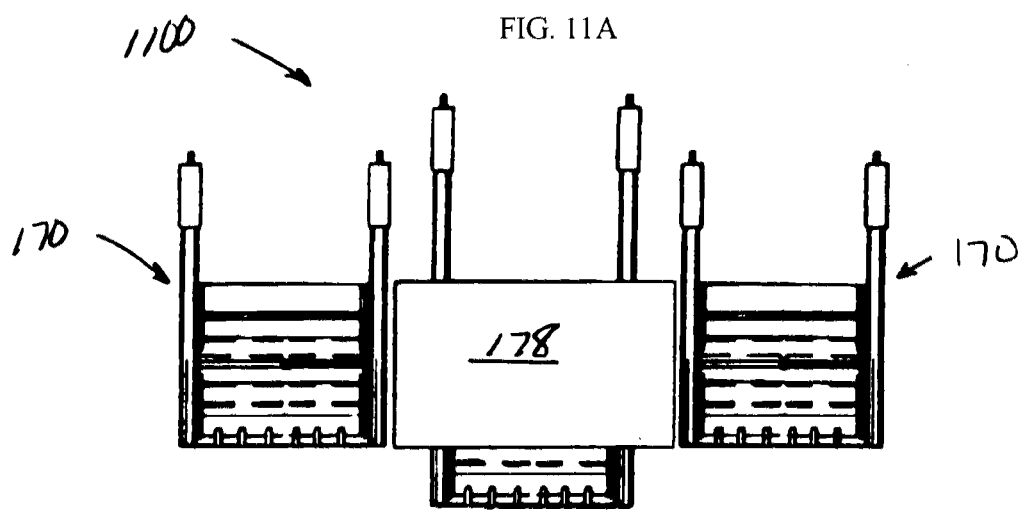

FIGS. 11A and 11B illustrate a rear view and a plan view, respectively, of a waterwheel apparatus 1100 having horizontal rotor assemblies 170 attached to a central floating object 178 that may be a barge, a structural foam filled pontoon, or other floating object. The operation and configuration of the rotor assemblies 170 are essentially the same as the horizontal floating rotor assemblies 170 described above in conjunction with other embodiments of waterwheel apparatus.

Undershot waterwheels as described herein may provide pollution-free production of either electrical or direct hydrokinetic shaft-driven energy for applications including, but not limited to: reverse osmosis desalination of water; production of hydrogen and medical grade oxygen by electrolysis; utilization of hydrogen and oxygen gases; point-to-point multipurpose energy transport; conversion of residual heat to steam; sequestering carbon dioxide; wind-assisted hydrokinetic energy generation and deep water cooling. Each of these applications is described briefly below. In the following descriptions, the platforms upon which the applications are performed are referred to as barges for the sake of simplicity and convenience. It will be appreciated that the applications may be implemented in or on one or more of the platforms described herein, including stationary platforms, floating platforms, submersible platforms and fixed and floating portable platforms.

In one embodiment multiple waterwheel rotor assemblies and a single or multiple barges of appropriate design may be tethered to the ocean floor to convert ocean currents or tidal flows to rotational energy. To utilize direct shaft-driven hydrokinetic energy, positive displacement pumps may be mounted on the rotor shafts of the waterwheels. Multiple desalination units can be mounted on the barge(s). Multiple cylindrical tanks may be secured to the underside of the barge(s). High-pressure hoses may be run from the discharges of the positive displacement pumps to the intakes of the desalination units. Internally, the desalination units may contain long tubes that are divided inside by semi-permeable membranes.

The positive displacement pumps can be activated by the rotation of the rotor assemblies, pumping seawater and increasing the pressure on the seawater side of the membranes. Because of the filtration level of the membranes, the pressure from the positive displacement pumps causes water molecules to flow through the membrane but does not allow salt molecules through. Pores in a membrane can vary, for example, from 1 to 50,000 angstroms depending on the desired level of filtration. The smallest pore size may be used for reverse osmosis "hyperfiltration."

In one embodiment, if the salinity of the water in the filters reaches a predetermined high limit, a computer may be pre-programmed to initiate a flush of the membranes. The highly saline water and the residual brine from previous operations are discharged to the ocean. High pressure hoses attached to the desalination units can either deliver the desalinated water directly to shore or fill tanks on barges or other water vessels for transport.

An alternative to the aforementioned desalination process is a photochemical desalination process that may be used in lieu of or in addition to the reverse osmosis process. Both processes can be energized by hydrokinetic power provided by embodiments of the waterwheel apparatus described herein.

Figure 13:
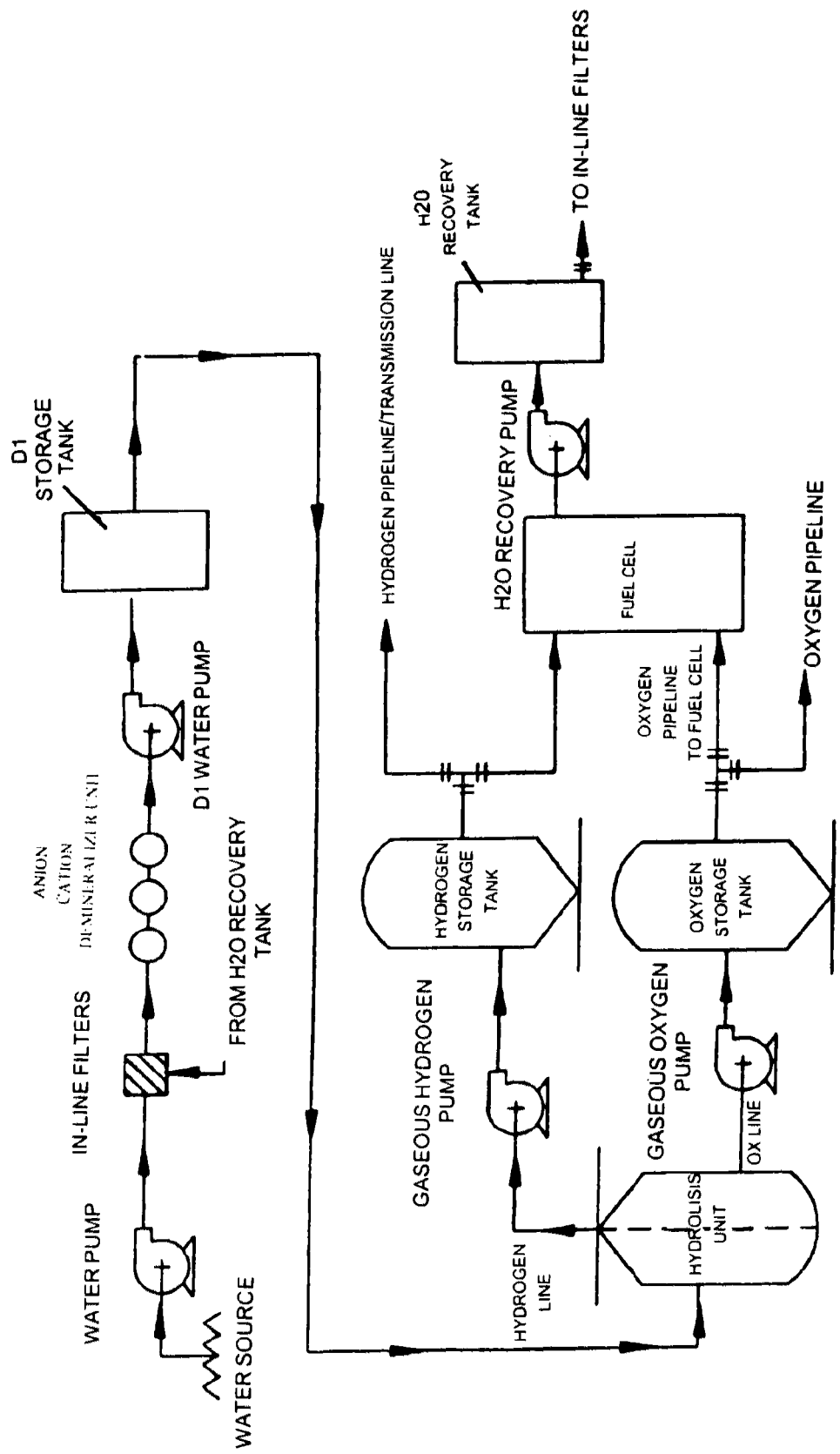
FIG. 13 illustrates a process for the generation of oxygen and hydrogen in one embodiment.

In one embodiment, as illustrated by the flow diagram of FIG. 13, hydrogen and oxygen gases may be produced by electrolysis. In one configuration, there may be tanks on the barge(s) that can be equipped with an inside barrier wall that divides the tanks into compartments. The barrier stops short of the bottom of the tank. A high-pressure hose pumps desalinated water through a demineralizer and into the tanks, filling them. Inside and at the top of the tanks, on each side of the barrier, are electrodes—an anode (positive) on one side of the barrier and a cathode (negative) on the other. The electrodes are connected to opposite poles of a source of direct current powered by the waterwheel. Each electrode attracts ions of the opposite charge. Therefore, positively charged ions (cations) move toward the cathode, and negatively charged ions (anions) move toward the anode.

The electric current disassociates water molecules into hydroxide ($OH^-$) and hydrogen ($H^+$) ions. At the cathode, hydrogen ions (H+) accept electrons in a reduction reaction that forms hydrogen gas. At the anode, hydroxide ions (OH−) undergo an oxidation reaction and give up electrons to the anode to complete the circuit and form water and oxygen gas. Oxygen gas can now be drawn off one side of the tanks and hydrogen gas from the other. The gases may then be transferred into their respective storage tanks beneath the barge(s) via high-pressure hoses and/or piping. The gases can then be off-loaded to other barges or floating vessels, in gaseous or liquid form, for transport.

The hydrogen and oxygen gases can be utilized to generate electrical power through onboard equipment such as fuel cells, gas-powered turbines, and/or modified reciprocating engines to power the various operating systems during slack tides. The purity of both gases significantly extends fuel cell life cycles and vastly minimizes required maintenance. This significantly lowers the operating costs of fuel cells in the production of renewable electric power.

These gases may also be used to fuel modified reciprocating engines and gas turbines. Utilization of pure oxygen in the combustion process eliminates the creation of nitrous oxides that are the precursor gas that creates smog. The electric power generated may also be sent ashore via underwater power lines to be marketed.

Figure 14:
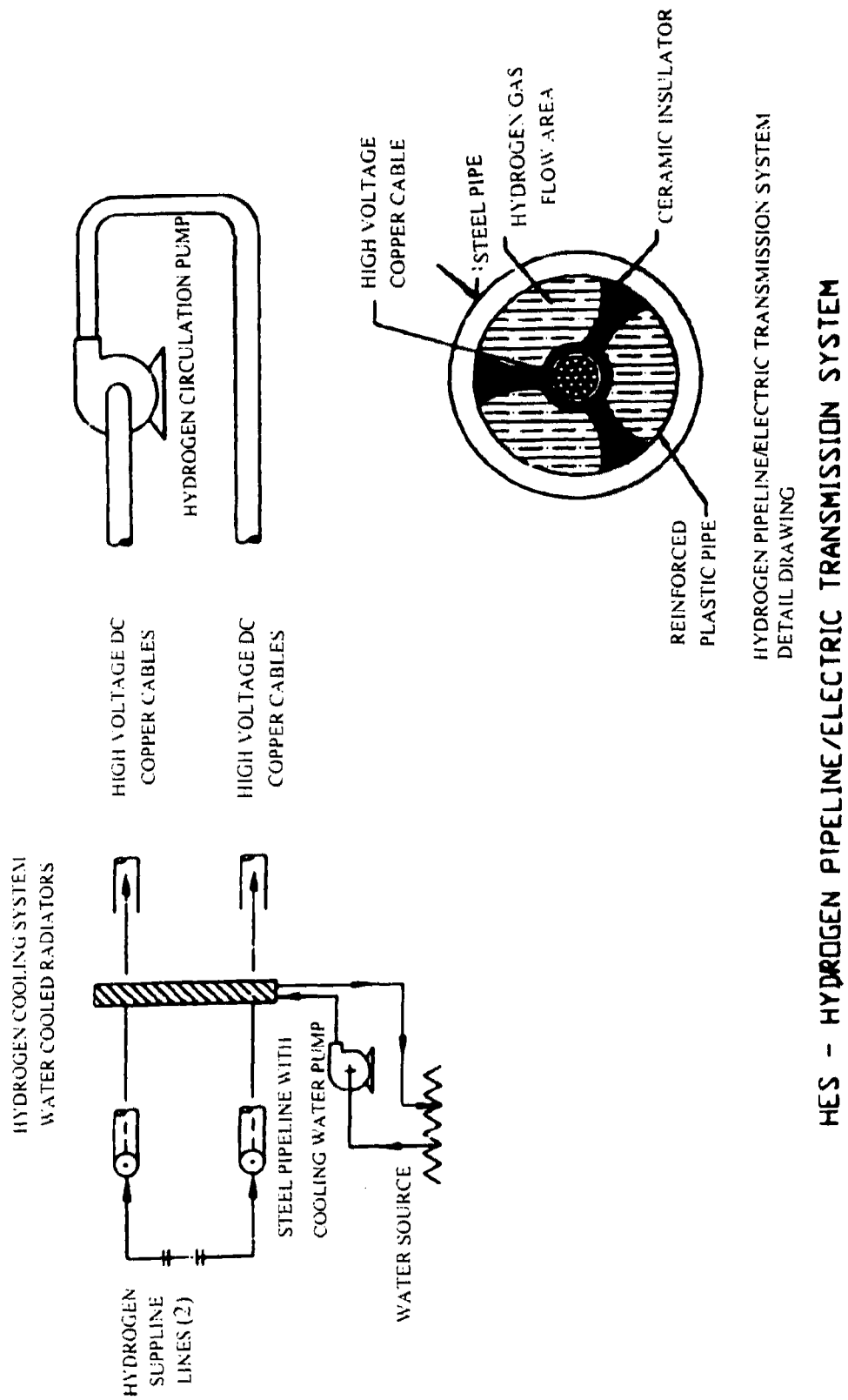
FIG. 14 illustrates a combination gas and electrical power transmission system in one embodiment.

In one embodiment, as illustrated in FIG. 14, both electrical power and hydrogen gas may be sent point-to-point via a multiple-purpose transportation pipeline. The pipe may be scaled to size to accommodate a large internal electrical conductor in the center. Ceramic insulators may separate areas through which the hydrogen gas will flow. Thus, electrical power and hydrogen gas may be transported simultaneously. Further, the hydrogen gas can be tapped at various points and run through a non-polluting electrical generating fuel cell.

The residual heat generated from the fuel cell can be converted to steam and marketed to steam-dependent industries along the pipeline, e.g., food processing plants. Residual heat passing over a bank of tubes that are filled with pressurized water transforms the water in the tubes to steam. The steam may then be piped to a steam turbine attached to an electric generator. Alternatively, the steam can be run through a steam turbine to generate additional non-polluting electrical power.

One embodiment can effectively inject and safely store carbon dioxide ($CO_2$) at the bottom of the ocean. As the negatively buoyant $CO_2$ encounters the high pressure in the low temperatures at depths greater than 3000 m, the gas turns into a dense liquid unable to rise to the ocean's surface. Its inherent properties lead to the formation of crystals, known as $CO_2$ hydrides, which collect into a solid, stable layer from under which the gas cannot escape. The $CO_2$ may be condensed and pressurized at other facilities. The $CO_2$ is delivered to the floating waterwheel apparatus, equipped with a positive displacement pump, energized by ocean currents and wind. The condensed $CO_2$ is pumped to the bottom of the ocean via a weighted submersible discharge hose on the waterwheel apparatus.

Figure 12:
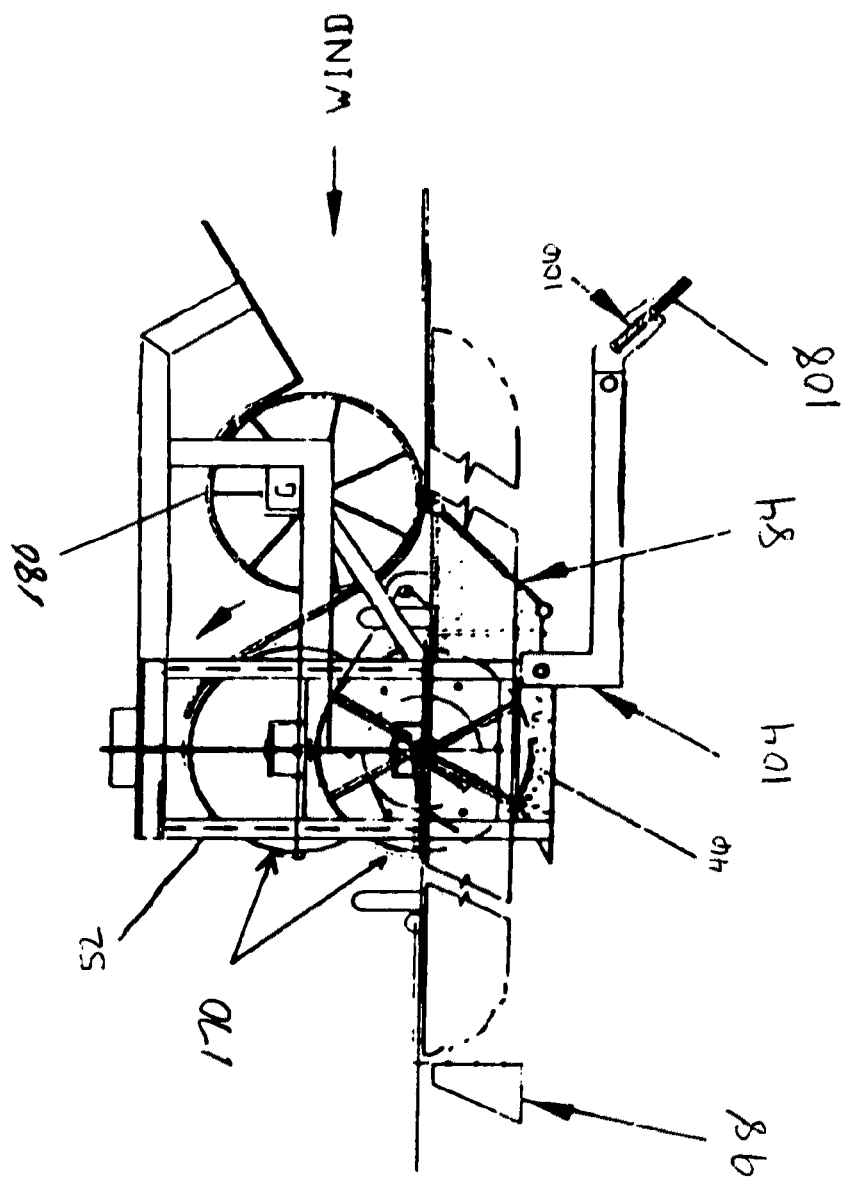
FIG. 12 illustrates a side view of a waterwheel apparatus with wind-assisted hydropower generation in one embodiment.

As illustrated in FIG. 12, fixed blade horizontal wind turbines, such as wind turbine 180, with spring-loaded air seals and venturi shaped inlets, can be mounted on the foredecks of a floating waterwheel rotor assemblies. The horizontal wind turbine drive shafts can accommodate electric generators, process pumps, compressors, etc. The addition of pulley and belt systems, and/or chain and sprocket assemblies between the fixed blade horizontal wind turbine 180 and the waterwheel rotor assemblies 170 can also increase the power output of the waterwheel rotor assembly.

Alternatively, installation of positive displacement pumps on the drive shafts of the horizontal wind turbine, and hydraulic motors on the drive shafts of the waterwheel rotor assemblies, can supply additional power. A hydraulic supply hose could convey the hydraulic energy to the hydraulic motor. This effectively reduces the number of onboard generators needed to one.

In one embodiment, one or more bull wheels may be mounted on the outboard rotor shafts of the rotor assembly or assemblies. The outer circumference of the bull wheel(s) may be fitted with belt grooves, chain sprocket teeth or spur gearing, for example, to drive various RPM increasing or reducing transmissions and to drive other types of equipment such as electrical generators (e.g., to produce on-board power) and pumps. Such transmissions may have multiple power takeoff points which may be engaged and disengaged with clutches.

Embodiments of the waterwheel apparatus may be used to power deep-water pumps to send cold water to shore installations via a cooling pipe. The cold water could be circulated through heat-exchangers in cooling systems in buildings and then discharged back into the originating body of water. This type of cooling system would replace chiller systems that are currently driven by polluting electrical power sources, thereby reducing operating costs and the carbon footprints of buildings. In parallel, electricity could be conveyed to shore with the cold water to power various pumps and fans in the buildings' heating, cooling and ventilating systems. This combination of pollution-free energy would result in buildings with no carbon footprint at all.

Thus, it is seen that an improved waterwheel and methods for its use are provided. One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A waterwheel apparatus, comprising:
   a rotor assembly, comprising an inboard rotor shaft, a pair of circular partitions separated by the inboard rotor shaft, a pair of outboard rotor shafts, and
   a plurality of hinged rotor blades radially oriented between the pair of circular partitions and coupled to the pair of partitions with hinge pins engaged with water-lubricated bearings in the hinged rotor blades, wherein the perimeter of each rotor blade comprises a groove configured to hold a spring-loaded water seal assembly and a plurality of through slots, the spring-loaded water seal assembly comprising:
      a water seal disposed within the groove, the water seal having a plurality of through holes essentially perpendicular to the radial orientation of the rotor blade;
      a plurality of compressed springs arrayed between an inner surface of the water seal and a bottom surface of the groove; and
      a plurality of keepers installed through the plurality of slots and the plurality of through holes, wherein the water seal is captured in the groove and forced outward from the groove.

2. The waterwheel apparatus of claim 1, wherein the partitions and rotor blades are fabricated from reinforced plastic additionally strengthened through internal and external iso-grid stiffening technology.

3. The waterwheel apparatus of claim 1, wherein the rotor shaft is fabricated from a wound plastic filament.

4. The waterwheel apparatus of claim 1, further comprising a hinged clamshell cover subtending approximately 180 degrees of the rotor assembly.

5. The waterwheel apparatus of claim 1, further comprising a wind turbine coupled with the rotor assembly.

6. The waterwheel apparatus of claim 1, further comprising a horizontal thrust shoe subtending an arc of rotation of the rotor assembly and having vertical support members configured to support the rotor assembly, wherein the water seal in each hinged rotor blade maintains contact with the horizontal thrust shoe through the arc of rotation when the rotor assembly is driven by water flow.

7. The waterwheel apparatus of claim 6, further comprising wear shields mounted between the partitions and ends of the hinged rotor blades, wherein water seals in the ends of the hinged rotor blades are sealed against the wear shields, the partitions further comprising a plurality of dampening stops to limit a range of motion of the hinged rotor blades during rotation of the rotor assembly.

8. The waterwheel apparatus of claim 7, wherein the horizontal thrust shoe is fabricated from aggregate and reinforced concrete.

9. The waterwheel apparatus of claim 7, further comprising a plurality of vertical water flow straightening vanes embedded in the horizontal thrust shoe.

10. The waterwheel apparatus of claim 6, further comprising a venturi-type inlet duct coupled to the vertical support members, the venturi-type inlet duct configured to direct and concentrate water flow against the hinged rotor blades of the rotor assembly.

11. The waterwheel apparatus of claim 10, further comprising an elongated inlet duct coupled with the venturi-type inlet duct, the elongated inlet duct comprising:
    a filtering/cleaning rake assembly; and
    a pressurized water backwash system.

12. The waterwheel apparatus of claim 6, further comprising a lifting frame assembly coupled with the vertical support members with jackscrews, the lifting frame assembly comprising:
    housings with rotor shaft bearings configured to support the pair of outboard rotor shafts; and
    equipment trays configured to support electrical and mechanical equipment driven by the rotor assembly, wherein the lifting frame assembly is configured to raise and lower the rotor assembly to maximize torque on the rotor assembly.

13. The waterwheel apparatus of claim 6, further comprising air dams on the outboard sides of the vertical support members to provide water seals between the waterwheel apparatus and sidewalls of a water causeway.

14. The waterwheel apparatus of claim 6, further comprising cantilevered rotor assemblies on the outboard rotor shafts to generate energy from water flow in a water causeway having sloping sidewalls.

15. The waterwheel apparatus of claim 6, further comprising a pair of pontoons coupled to the vertical support members, the pontoons configured to selectively float and submerge the waterwheel assembly.

16. The waterwheel apparatus of claim 15, further comprising a remote controlled maneuvering and parking rudder assembly attached to a pontoon and configured to maneuver the waterwheel apparatus in and out of a water flow.

17. The waterwheel apparatus of claim 15, further comprising a drop-leg yoke coupled with the vertical support members, the drop-leg yoke comprising a surge suppressor spring assembly and a tether cable, wherein the surge suppressor spring assembly is configured to moderate movement of the waterwheel apparatus in the presence of water surges, and wherein the tether cable comprises one or more of a power cable, an air hose, buoyancy chambers and communication cables.

18. The waterwheel apparatus of claim 17, further comprising a tether cable cleaning apparatus configured to crawl up and down the tether cable and to remove debris and marine growth from the tether cable.

19. The waterwheel apparatus of claim 1, wherein the rotor assembly is mounted vertically to one of a fixed, floating and submerged object.

20. The waterwheel apparatus of claim 19, further comprising a vertical thrust shoe subtending an arc of rotation of the rotor assembly, wherein the water seal in each hinged rotor blade maintains contact with the vertical thrust shoe through the arc of rotation when the rotor assembly is driven by water flow.

21. The waterwheel apparatus of claim 20, wherein the fixed object comprises a cylindrical pier having a circumference, the waterwheel apparatus further comprising:
  a first rack and pinion coupling between the rotor assembly and the cylindrical pier configured to rotate the rotor assembly around the circumference of the cylindrical pier; and
  a second rack and pinion coupling between the rotor assembly and the cylindrical pier configured to raise and lower the rotor assembly.

* * * * *